(12) United States Patent
Tsokos et al.

(10) Patent No.: US 11,483,335 B1
(45) Date of Patent: Oct. 25, 2022

(54) CYBERSECURITY: RELIABILITY OF A COMPUTER NETWORK

(71) Applicant: University of South Florida, Tampa, FL (US)

(72) Inventors: Christos Peter Tsokos, Tampa, FL (US); Freeh Naef Alenezi, Riverview, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/110,962

(22) Filed: Dec. 3, 2020

(51) Int. Cl.
*H04L 9/40* (2022.01)
*G06N 7/00* (2006.01)
*G06K 9/62* (2022.01)
*H04L 41/147* (2022.01)

(52) U.S. Cl.
CPC ........ *H04L 63/1433* (2013.01); *G06K 9/6277* (2013.01); *G06N 7/005* (2013.01); *H04L 41/147* (2013.01)

(58) Field of Classification Search
None
See application file for complete search history.

(56) References Cited

U.S. PATENT DOCUMENTS

| | | | |
|---|---|---|---|
| 8,660,025 B2 | 2/2014 | Lin et al. | |
| 8,839,046 B2 | 9/2014 | McLean et al. | |
| 10,003,985 B1 | 6/2018 | Holland et al. | |
| 10,268,660 B1 * | 4/2019 | Arazi | A63F 13/50 |
| 10,650,150 B1 * | 5/2020 | Rajasooriya | G06N 7/005 |
| 10,659,488 B1 * | 5/2020 | Rajasooriya | G06F 21/577 |
| 10,754,959 B1 * | 8/2020 | Rajasooriya | G06F 21/567 |
| 11,017,096 B2 * | 5/2021 | Tsokos | G06F 16/26 |
| 2006/0178887 A1 * | 8/2006 | Webber | G10L 15/144 704/256 |
| 2008/0010225 A1 * | 1/2008 | Gonsalves | G06N 7/005 706/11 |
| 2008/0098479 A1 * | 4/2008 | O'Rourke | H04L 63/1433 726/25 |
| 2016/0078309 A1 * | 3/2016 | Feldman | G06T 7/11 382/131 |
| 2017/0046519 A1 * | 2/2017 | Cam | G06N 7/005 |
| 2018/0241767 A1 | 8/2018 | Crabtree et al. | |
| 2020/0285755 A1 | 9/2020 | Kassoumeh et al. | |

OTHER PUBLICATIONS

Sunil Abraham and Suku Nair, "A Predictive Framework for CyberSecurity Analytics Using Attack Graphs", Jan. 2015, International Journal of Computer Networks & Communications (IJCNC) vol. 7, No. 1. (Year: 2015).*
Sasith Rajasooriya, Chris Tsokos, Pubudu Kalpani Kaluarachchi, "Stochastic Modelling of Vulnerability Life Cycle and Security Risk Evaluation", Jul. 2016, Journal of Information Security, 2016, 7, 269-279. (Year: 2016).*

(Continued)

*Primary Examiner* — Kaveh Abrishamkar
(74) *Attorney, Agent, or Firm* — Quarles & Brady LLP

(57) ABSTRACT

Statistical models for predicting minimum number of step data of an attacker and reliability functions of a computer network system are described. The models are based on utilizing vulnerability information along with an attack graph. Using the model, it is possible to identify the interaction among vulnerabilities and individual variables or risk factors that drive the minimum number of step data. Gaining a better understanding of the relationship between the vulnerabilities and their interactions can provide security administrators with a better view and understanding of their security status.

20 Claims, 15 Drawing Sheets

(56) References Cited

OTHER PUBLICATIONS

Funke, Daniel. "PolitiFact: How Common Are Data Breaches—and What Can You Do about Them?" Tampa Bay Times (2019).
Jajodia, Sushil; et al. "Advanced cyber attack modeling analysis and visualization." George Mason Univ Fairfax VA, (2010).
Kaluarachchi, Pubudu Kalpani; et al. "Cybersecurity: a statistical predictive model for the expected path length." Journal of information Security 7.3 (2016): 112-128.
Kaluarachchi, Pubudu Kalpani. "Cybersecurity: stochastic analysis and modelling of vulnerabilities to determine the network security and attackers behavior." (2017).
Kijsanayothin, Phongphun. "Network security modeling with intelligent and complexity analysis." Diss. (2010).
Miladinovic, Branko; et al. "Ordinary, Bayes, empirical Bayes, and non-parametric reliability analysis for the modified Gumbel failure model." Nonlinear Analysis: Theory, Methods & Applications 71.12 (2009): e1426-e1436.
Moore, Edward F.; et al. "Reliable circuits using less reliable relays." Journal of the Franklin Institute 262.3 (1956): 191-208.
Noel, Steven, et al. "Multiple coordinated views for network attack graphs." IEEE Workshop on Visualization for Computer Security, (2005).(VizSEC 05).. IEEE.
Rajasooriya, Sasith M; et al. "Cyber security: Nonlinear stochastic models for predicting the exploitability." Journal of Information Security 8.02 (2017): 125.
Silverman, Bernard W. "Density estimation for statistics and data analysis." vol. 26. CRC press, (1986).

* cited by examiner

CYBERSECURITY: RELIABILITY OF A COMPUTER NETWORK

CROSS-REFERENCE TO RELATED APPLICATIONS

This application is related to U.S. Non-Provisional application Ser. No. 15/829,264, filed Dec. 1, 2017, titled "PREDICTIVE MODEL FOR OVERALL NETWORK SECURITY RISK," now U.S. Pat. No. 10,848,515, the entire contents of which is hereby incorporated herein by reference. This application is also related to U.S. Non-Provisional application Ser. No. 15/875,249, filed Jan. 19, 2018, titled "NON-LINEAR STOCHASTIC MODELS FOR PREDICTING EXPLOITABILITY," now U.S. Pat. No. 10,754,959, the entire contents of which is hereby incorporated herein by reference. This application is also related to U.S. Non-Provisional application Ser. No. 15/907,968, filed Feb. 28, 2018, titled "STATISTICAL PREDICTIVE MODEL FOR EXPECTED PATH LENGTH," now U.S. Pat. No. 10,659,488, the entire contents of which is hereby incorporated herein by reference. This application is also related to U.S. Non-Provisional application Ser. No. 15/907,810, filed Feb. 28, 2018, titled "VULNERABILITY LIFE CYCLE EXPLOITATION TIMING MODELING," now U.S. Pat. No. 10,650,150, the entire contents of which is hereby incorporated herein by reference. This application is also related to U.S. Non-Provisional application Ser. No. 16/427,653, filed May 31, 2019, titled "PREDICTION OF SOFTWARE VULNERABILITIES," the entire contents of which is hereby incorporated herein by reference.

BACKGROUND

In computing systems, a vulnerability can be defined as a weakness in software, hardware, firmware, etc. that can be exploited to gain access to certain resources. The management of vulnerabilities includes the practice of identifying and classifying vulnerabilities in computing systems and removing them. A vulnerability for which a working and implemented attack is known can be described as an exploitable vulnerability. A vulnerability is exploitable from the time when it is introduced to when it is removed or patched.

Vulnerabilities can be relatively difficult to categorize and mitigate. The Common Vulnerability Scoring System (CVSS) provides a way to characterize or define the principal characteristics of a vulnerability. The CVSS also provides a numerical score that reflects the severity of various vulnerabilities. The numerical score can be presented as a qualitative representation (e.g., low, medium, and high risk) to help prioritize vulnerability management processes.

BRIEF DESCRIPTION OF THE DRAWINGS

For a more complete understanding of the embodiments and the advantages thereof, reference is now made to the following description, in conjunction with the accompanying figures briefly described as follows.

Figure 1:
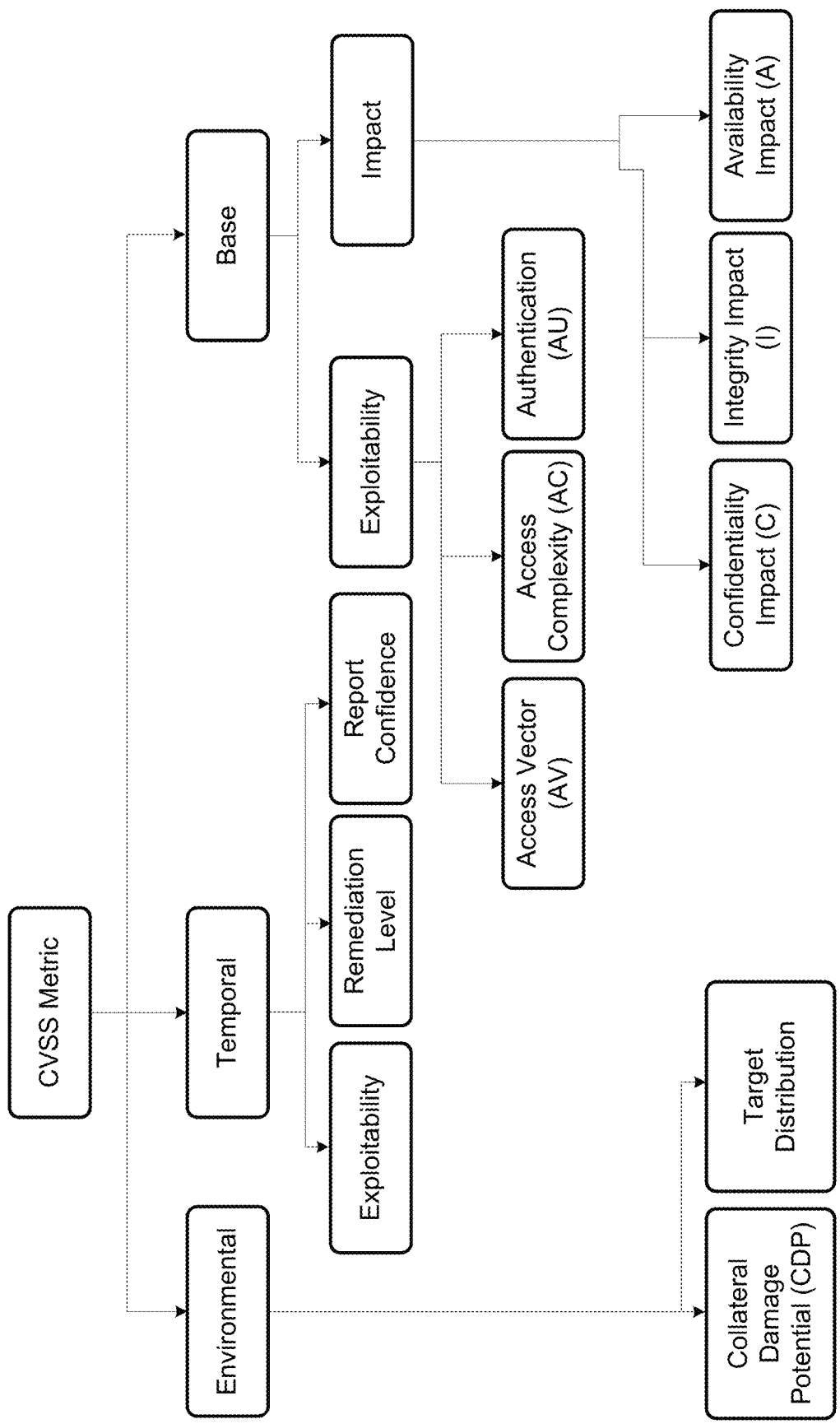
FIG. 1 illustrates organizational aspects of the Common Vulnerability Scoring System (CVSS) framework according to various examples described herein.

The drawings illustrate only example embodiments and are therefore not to be considered limiting of the scope of the embodiments described herein, as other embodiments are within the scope of the disclosure.

DETAILED DESCRIPTION

Cyber-attacks are a formidable security challenge faced by most governments and large scale companies, among other entities. Cyber criminals are using increasingly sophisticated network and social engineering techniques to steal crucial information which directly affects government and company objectives. Thus, in understanding the performance, availability, and reliability of computer networks, quantitative measurement techniques play an important role. Quantitative measures are now commonly used to evaluate the security of computer network systems. These measures help administrators make important decisions regarding network security.

Cyber situational awareness is related to the knowledge of friendly, adversary, and other relevant information regarding activities in and through cyberspace. It can be obtained from a combination of intelligence and operational activity in cyberspace and other domains (including the electromagnetic spectrum), both unilaterally and through collaboration among partners.

Cyber situational awareness helps security analysts and decision makers visualize and understand the current state of the information technology (IT) infrastructure, as well as the defensive posture of the IT environment. It also helps to identify what infrastructure components are important to complete key functions, understand the possible actions an adversary could undertake to damage critical IT infrastructure components, and determine where to look for key indicators of malicious activity.

The reliability of computer networks is a relatively crucial matter for businesses, governments, and even individuals. Network security breaches mostly happen when hackers identify and exploit known and unknown software vulnerabilities, since vendors are obligated to publish the vulnerabilities of their products. The National Vulnerability Database (NVD) is a publicly and freely available comprehensive database of such vulnerability data.

In the last 10 years, individuals have dramatically increased their online presence, and negative consequences have followed repeated massive data breaches. One definition of a data breach is any compromise of security that leads to loss, alteration, unauthorized disclosure of, or access to protected data. Data breaches can be categorized in a number of different ways. First, data breaches can be caused by external actors or factors, such as hackers stealing personal or financial information with malicious intent. Second, data breaches can be caused by accident, such as when a company holding sensitive information leaks it by mistake. These breaches are likely to go undiscovered for some time. Third, data breach can be cause by the third parties, such as external contractors who are not familiar with security measures and standards of the company with whom they contract or work with.

The number and size of data breaches have increased recently. However, there is no single federal law in the United States that requires notifying impacted consumers about a data breach. Instead, there is a "patchwork" of 50 state laws. Some states do not require public disclosure of data breaches. Also, there is a discrepancy among the states in their views about what data is considered "sensitive." These factors make it difficult to estimate the real economic and business impact caused by data breaches.

The size of a data breach is measured by the number of records exposed. It is important to consider the types of data exposed during a data breach. Personal data and medical records are typically the most sought-after types of data, since they can be used in various ways to forge and imitate user actions. One way to prevent system breaches is to analyze the behavior of hackers, understand the advanced techniques they will use during cybercrime activities, and build and maintain a highly reliable computer network to avoid data breaches.

To date, relatively little work has been conducted to analyze the reliability of computer network systems based on the vulnerabilities of the systems. The data-driven, analytic reliability embodiments described herein offer new ways to assist cybersecurity specialists not only in monitoring the security status but also in the reliability status of their computer networks. In particular, they can manage and understand the impact of the unfixed and newly discovered vulnerabilities of individual computers to the reliability estimate of their network.

In the field of cybersecurity, the hack event can be considered as a death or failure event of a particular computer system. Therefore, the reliability of a hardware or software system can be defined as the probability that it will not be hacked with respect to a specified period of time or steps. Similarly, the reliability of a computer network can be defined as the probability that it will not be hacked until a predetermined period of time or steps is reached. The concepts described herein consider a computer network system in which a computer network is hacked if and only if a last computer in the network system is hacked, assuming the hacking event started from a first computer. The concepts can also be applied to identify hacking events in any computer or software device(s) among a chain of such devices in a computer network system.

U.S. Pat. No. 10,659,488 (the '488 patent) describes the use of the National Vulnerability Database to model a computer network system with a host centric attack graph. The Markov process is then applied by using vulnerability information of each system in the network to understand the behavior of network topology. The '488 patent also describes the use of a nonlinear statistical model to estimate the expected path length of hacking the computer network as a function of systems vulnerability scores using the Markovian iteration process. An absorbing matrix is also obtained for each set of systems vulnerabilities in the network, which identifies the minimum number of steps that the attacker is required to compromise the network with high probability. Using these computations, the '488 patent also describes the development of another statistical model to predict the minimum number of steps needed for the attacker to reach the goal state with high probability. The concepts described herein build, in part, upon the concepts described in the '488 patent.

Using the approaches described in the '488 patent, where vulnerability information for each component in a computer network system is available, it is possible to estimate an expected path length for an attacker to hack the network and the minimum number of steps that an attacker will need to successfully hack the network, with high probability. Alternating one or more of the components in the computer network system with different vulnerability information will normally result in a different expected path length and minimum number of steps for an attacker to hack the network with high probability.

The embodiments described herein expand upon the approaches described in the '488 patent. The embodiments are described with reference to an example computer network system, but the methodologies and concepts are applicable and can be extended to other computer network systems. The embodiments model, parametrically and non-parametrically, the expected path lengths for a hacker to compromise a computer network system and the minimum number of steps that an attacker needs to hack the network with high probability and different vulnerability information. The concepts build upon the statistical models provided in the '488 patent to calculate the expected path length and minimum number of steps that an attacker will need to hack the network with high probability.

For a given computer network system that consists of two computers with three vulnerabilities, $v_1$, $v_2$, $v_3$, the embodiments identify the operating system vulnerabilities from the NVD. Then, the embodiments can randomly and without replacement select a set of three vulnerabilities and calculate its expected path length. This random selection process is repeated several times to find minimum number of steps values. Additionally, the embodiments randomly and without replacement select a set of three vulnerabilities and calculate its minimum number of steps for a hacker to compromise the network system with high probability. This random selection process can be repeated many times minimum number of steps values.

The embodiments also proceed to identify the probability distribution functions that characterize the probabilistic behaviors of the expected path lengths for a hacker to compromise the computer network and the minimum number of steps that an attacker needs to hack the computer network with high probability, respectively. Furthermore, the embodiments develop parametric and non-parametric reliability functions of the network system.

The parametric and non-parametric modeling can be relied upon to assist cybersecurity specialists not only in monitoring the security status but also in the reliability status of a network. The models are especially useful in estimating the probability that a randomly selected set of vulnerabilities in the computer network system will have an expected path length that falls between two desired time units. Similar usefulness applies to the minimum number of steps that an attacker needs to hack the network system with high probability.

According to the aspects of the embodiments, statistical models for predicting an expected path length ("EPL") and minimum number of steps of an attacker are described. The models are based, in part, on utilizing vulnerability information along with an attack graph. Using the models, it is possible to identify the interaction among vulnerabilities and variables or risk factors that drive the EPL and minimum number of steps. Having a better understanding of the relationship between the vulnerabilities and their interactions can provide security administrators with a better view and understanding of their security status. Having these estimates at hand, appropriate counter steps can be taken.

Before turning to a more detailed description of the embodiments, certain terminology associated with cyber security is introduced below. Some basic aspects of Markov chains properties are also introduced.

In computer security, a vulnerability is a weakness or flaw in a computer system. Among other factors, a vulnerability can be defined by the intersection of three system elements, including susceptibility to the flaw, attacker access to the flaw, and attacker capability to exploit the flaw. To exploit a vulnerability, an attacker must have at least one applicable tool or technique that can exploit a system weakness. In this context, a vulnerability is also known as an attack surface.

In the context of vulnerabilities, a software vulnerability is an instance of an error in the specification, development, or configuration of software such that its execution can violate a security policy. The attack surface of a software environment is the sum of the different points (the "attack vectors") where an unauthorized user or attacker can try to enter data to or extract data from an environment, for example. Attackers normally use known vulnerabilities listed publicly on the National Vulnerability Database (NVD) to penetrate computing systems. In some cases, attackers can leverage vulnerabilities that have not been disclosed publicly, called zero day vulnerabilities. Zero day vulnerabilities remain unknown to vendors, and such vulnerabilities gives attackers a "free pass" to attack certain hosts.

An attack graph is a succinct representation of various paths through a system that end in a state where an intruder has successfully achieved a goal. Thus, attack graphs describe ways in which an adversary can exploit vulnerabilities to break into a system. System administrators analyze attack graphs to understand where system weaknesses lie and decide which security measures should be deployed for maximum effectiveness.

An attack graph can also be relied upon to examine the logical relationships between multiple exploits. However, when the size and complexity of enterprise networks increase, two major problems occur. First, attack graphs grow exponentially as the size of the networks increase in complexity. Second, the ability to evaluate the information conveyed in the attack graphs becomes more and more difficult. To help with those problems (and others in the field), recent studies have developed some useful statistical models that predict security risks based on various vulnerabilities using the Common Vulnerability Scoring System (CVSS) framework with a Markovian process.

Statistical models to evaluate the security of a computer network system can be based on vulnerability information, including the CVSS, which classifies vulnerabilities into different levels, such as low, medium, and high levels. In that context, FIG. 1 illustrates organizational aspects of the CVSS framework according to various examples described herein. The CVSS framework provides an open framework for communicating and analyzing the characteristics and impacts of vulnerabilities in computing systems. The CVSS framework is a free and open industry standard for assessing the severity of computer system security vulnerabilities. The concepts described herein can use the metrics defined by the CVSS framework or similar metrics defined by related frameworks.

The quantitative model of the CVSS framework leads to repeatable and accurate measurements while enabling users to see the underlying vulnerability characteristics used to generate vulnerability-related scores. Thus, the CVSS framework is suitable as a standard measurement system for industries, organizations, and governments to accurately and consistently analyze vulnerabilities. Two common uses of the CVSS framework are the prioritization of vulnerability remediation activities and the calculation of the severity of vulnerabilities. The NVD provides CVSS scores for almost all known vulnerabilities.

Risk metrics or scores in the CVSS framework include three metric groups including base, temporal, and environmental metrics or sub-scores, as shown in FIG. 1. The values of base metrics can be assigned by an analyst, determined by a base metric score equation, determined by an equation and adjusted by an analyst, or calculated in other ways. An equation to calculate the base metric score (and the other metrics) can be formed as two sub equations, for example, such as an exploitability sub score equation for the exploitability sub score and an impact sub score equation for the impact sub score. A base metric can be computed as a score ranging from 0.0 to 10.0, for example, but other ranges can be used. As an example, vulnerabilities with a base score range from about 0-3.9 can be considered low vulnerability, 4.0-6.9 can be considered medium vulnerability, and 7.0-10 can be considered high vulnerability.

As noted above and shown in FIG. 1, the base metric or score can be computed using a number of sub-scores, such as exploitability and impact sub-scores. The exploitability metrics or sub-scores are related to the ease and technical means by which a vulnerability can be exploited. The exploitability sub-score can be computed based on a combination of access vector (AV), access complexity (AC), and authentication (AU) sub-scores. For example, the exploitability sub-score can be computed based on an equation or function of the access vector, access complexity, and authentication sub-scores.

The impact metrics or sub-scores are related to the consequences that can occur to components after a successful exploit. The impact sub-score can be computed based on a combination of confidentiality (C), integrity impact (I), and availability impact (A) sub-scores. For example, the impact sub-score can be computed based on an equation or function of confidentiality, integrity impact, and availability impact sub-scores.

Temporal metrics are related to the characteristics of a vulnerability that change over time but not across environments. The temporal metrics can be computed using a number of sub-scores, such as exploitability, remediation level, and report confidence sub-scores. In that context, exploitability is related to how complex the exploitation process is. The remediation level can be related to the number of different measures or solutions available to counteract the vulnerability. The report confidence can be related to the degree of confidence in the existence of the exploitability.

Environmental metrics are related to the characteristics of a vulnerability that are unique to a particular user environment (but might not change over time). The environmental metrics can be computed using a number of sub-scores, such as collateral damage potential and target distribution sub-scores. The collateral damage potential can be related to the potential for loss in or damage to physical property, personal casualties, reputation, or goodwill. The target distribution can be related to the number of target systems susceptible to the vulnerability.

Attackers often penetrate computer networks via a chain of exploits, where each exploit in the chain creates the foundation for an upcoming exploit. A combination (e.g., chain) of such exploits is called an attack path, and a collection of attack paths can be used to develop an attack graph. Thus, an attack graph is representative of all known paths through which an attacker can infiltrate and attack a system. Various algorithms have been developed to construct attack graphs. However, it is relatively difficult to analyze networks using attack graphs, particularly as the number of nodes and complexity of networks increase. As the scalability and complexity of networks increase, the computational costs needed to create and evaluate attack graphs also increases. At the same time, without complicated attack graphs, it might not be possible to analyze the vulnerabilities in complex computing systems.

A Markov chain is one modeling technique that has been used effectively in various fields, such as reliability analysis, performance analysis, dependability analysis, and cybersecurity analysis, among others. As described below, an attack graph can be modeled using a Markov chain with the real behavior of the attacker in conjunction with the Markovian properties.

A discrete type stochastic process $X=\{X_N, N \geq 0\}$ is called a Markov chain if for any sequence of states $\{X_0, X_1, \ldots, X_N\}$, the next state depends only on the current state and not on the sequence of events that preceded it, which is called the Markov property. The Markovian property reveals the fact that the transitions between states are memoryless and that transitioning to the next step depends only on the current state and not on any previous states. This property can be correlated with the behavior of an attacker in the sense that an attacker needs to exploit several nodes before reaching a goal node. When the attacker starts attacking an initial node to reach the goal node, there can be many other nodes, called intermediate nodes, before reaching the goal node. When an attacker reaches any intermediate node, there is no memory of previous nodes. In other words, an assumption can be made that the transition probabilities P of an attack do not depend on time. This is called time homogeneity.

A brief review of the Markov process is first provided before turning to other aspects of the embodiments. To consider Markov chains and transition probabilities, let S be a discrete set. A Markov chain $(X=\{X_n, n \geq 0\})$ is a sequence of random variables $X_0, X_1, \ldots$ taking values in S with the property that:

$$P(X_{n+1}=j|X_0=x_0, \ldots, X_{n-1}=x_{n-1}, X_n=i) = P(X_{n+1}=j|X_n=i), \quad (1)$$

for all $x_0, \ldots, x_{n-1}, i, j \in S$, and $n \geq 0$. The set S is the space of the Markov chain. A Markov chain is time-homogeneous if the probabilities in (1) do not depend on n. The transition probabilities $(P_{ij})$ for a Markov chain can be defined by $P_{ij}=P(X_{n+1}=j|X_n=i)$.

A stochastic matrix is a square matrix P which satisfies $P_{ij} \in [0, 1]$ for all i and j, and for each row i, $\Sigma_j P_{ij}=1$. As for transient states, let P be the transition probability matrix for the Markov chain $X_n$. With a probability of 1, a state i is named transient state if the chain visits it only a finite number of times. The Markov chain is an absorbing Markov chain if it includes at least one absorbing state where it is possible to reach the absorbing state from any other state by a finite number of steps.

As for the prediction of an EPL, the transition matrix for an absorbing Markov chain has the following canonical form:

$$P = \begin{bmatrix} Q & R \\ 0 & I \end{bmatrix}, \quad (2)$$

where Q is a t-by-t matrix (t-number of transient states), R is a nonzero t-by-r matrix for absorbing states, 0 is an r-by-t zero matrix, and I is the r-by-r identity matrix. The probability that a chain will be absorbed in an absorbing Markov chain is always 1, therefore we have: $Q^n \rightarrow 0$, as $n \rightarrow \infty$.

This implies that all the eigenvalues of Q have absolute values strictly less than 1. Then (I–Q) is an invertible matrix as follows:

$$M=(I-Q)^{-1}=1+Q+Q^2+Q^3+ \quad (3)$$

Matrix M is the fundamental matrix of P. The matrix elements, $M_{i,j}$, give the expected number of visits to state i when the chain started at state j. Hence, to compute the expected number of steps that started at state j before the chain enters a recurrent class, it is possible to sum $M_{i,j}$, over all transient states i.

For the prediction of the minimum number of steps, after feeding the transition probability matrix P with actual vulnerability scores (e.g., CVSS scores), it is possible to obtain the minimum required number of steps to achieve the goal state. For this, the use the matrices $P^2, P^3, P^4, \ldots$ up to k steps $P^k$. In this process, the absorbing states are achieved and k is considered the number of steps to compromise the network security. The process can also be evaluated by changing the CVSS scores and calculating for each combination of $V_1, V_2,$ and $V_3$ to find the minimum number of steps that the attacker need to reach the goal state with high probability.

Figure 2:
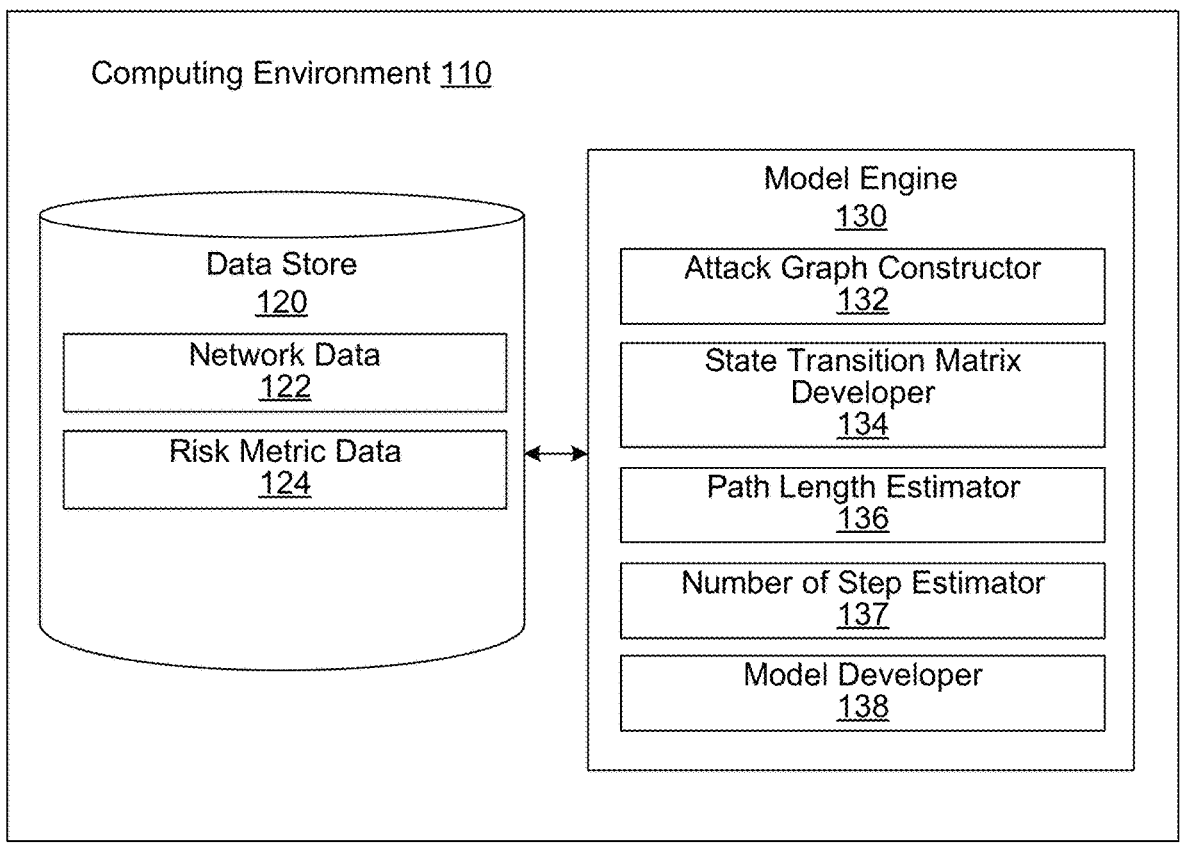
FIG. 2 illustrates a computing environment for evaluating the reliability of computer network systems according to various examples described herein.

FIG. 2 illustrates a computing environment 110 for evaluating the reliability of computer network systems according to various examples described herein. Among other components, the computing environment 110 includes a data store 120 and a model engine 130. Among other data, the data store 120 includes memory areas to store network data 122 and risk metric data 124. The model engine 130 includes an attack graph constructor 132, a state transition matrix developer 134, a path length estimator 136, a number of step estimator 137, and a model developer 138, the operation of each of which is described in further detail below.

The computing environment 110 can be embodied as one or more computing devices or systems. In various embodiments, the computing environment 110 can be embodied as a desktop, laptop, server or other type(s) of computing devices or systems. As described herein, the model engine 130 in the computing environment 110 is configured to generate a statistical predictive model for expected path length. The model can be generated to evaluate relatively large networks of computing systems having a number of network nodes. The computing systems and devices in such networks can be located at a single installation site or distributed among different geographical locations. The computing devices in such networks can also include computing devices that together embody a hosted computing resource, a grid computing resource, and/or other distributed computing arrangement.

The computing environment 110 and the network of computing systems evaluated by the computing environment 110 can be coupled to one or more networks embodied by the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with other computing devices and systems using any suitable systems interconnect models and/or protocols. Although not illustrated in FIG. 2, the computing environment 110 can be coupled to any number of network hosts, such as website servers, file servers, network switches, networked computing resources, databases, data stores, and other network or computing platforms.

The network data 122 can include data related to the computing network systems being evaluated by the model engine 130, which the computing environment 110 may or may not be communicatively coupled to. In that context, the network data 122 can define certain aspects of the computing devices and components, networking devices and components, and related components being evaluated by the model engine 130, such as the serial numbers, model numbers, operating system versions, services, and other information associated with them. The network data 122 can also specify the logical arrangement of those devices among each other, including the network connections between them. The network data 122 can include all the information necessary for the attack graph constructor 132 to generate an attack graph as described herein.

The risk metric data 124 can include a number of risk metrics, including CVSS and CVE data among other risk metric data, associated with devices specified in the network data 122. As one example, according to the CVSS framework, the risk metrics can include base, temporal, and environmental metrics, among others, for the devices specified in the network data 122. However, the risk metric data 124 is not limited to the types of metrics used in the CVSS framework, as other types and formats of risk metrics can be relied upon.

The attack graph constructor 132 is configured to construct attack graphs based on the network data 122. The network topology information defined in the network data 122 can include serial numbers, model numbers, operating system versions, services, and other identifying information. The network topology information can also specify the logical arrangement of host devices among each other, including the network connections between them. The network topology information can specify a number of hosts in enterprise systems, services running on each host in the network, rules defined on firewalls, network switches, etc., and vulnerabilities associated with each host and service among other topology information. For simplicity, a limited number of nodes are present in the examples described herein, but attack graphs of any size can be used. In the attack graphs described herein, each node can be representative of any of the above-described (or related) types of host computing devices, systems, or services. Each host can include various types of vulnerabilities.

Once an attack graph is created, vulnerability scores can be assigned to the vulnerabilities of the hosts in the attack graph using information from the risk metric data 124, such as CVSS framework metric data. The scores can be computed based on a number of scores and sub-scores, such as those shown in FIG. 1, for example, using one or more expressions, equations, or sub-equations that relate them. In some cases, one or more standard expressions can be used to calculate scores based on matrices that provide a quantitative score to approximate the ease and/or impact of the vulnerabilities in the nodes. The exploitability and impact sub-scores, for example, can also be combined to provide the basis of assigning scores to directed connections among the nodes in attack graphs as probabilities. Those probabilities can represent the possibility of a vulnerability being exploited by an attacker.

Figure 3:
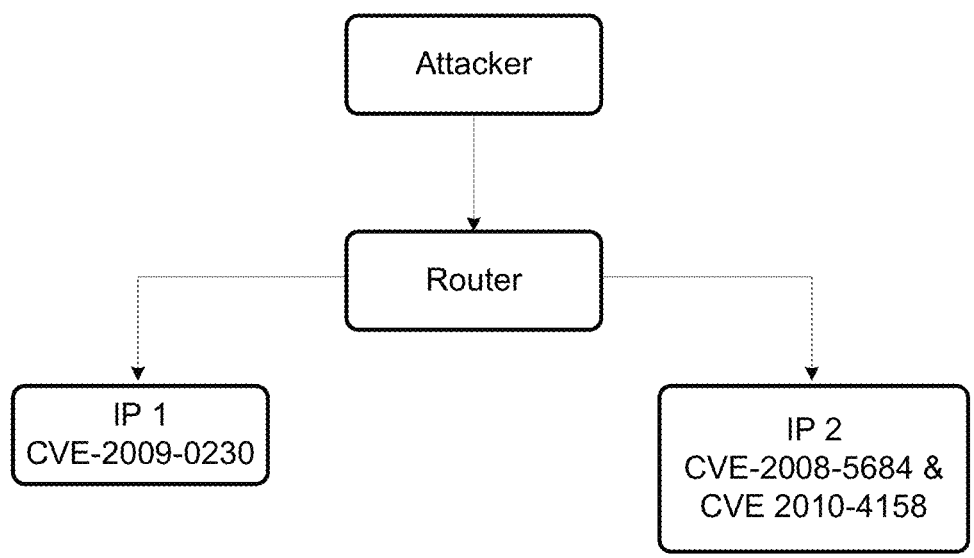
FIG. 3 illustrates an example network topology according to various examples described herein.

FIG. 3 illustrates an example network topology to provide context for the proposed model described herein. The network consists of two server hosts, IP 1 and IP 2, and the workstation of an attacker connecting to each of the hosts via a central router. In the server IP 1, the vulnerability is labeled CVE 2009-0230 and is considered $V_1$. In the server IP 2, there are two vulnerabilities labeled CVE 2008-5684 and CVE 2010-4158, considered $V_2$ and $V_3$, respectively.

One component of the model and methods described herein is the attack graph. An attack graph for a computing system can include several state nodes, which represent the system vulnerabilities and the state of an attacker with respect to those vulnerabilities. A node in the attack graph is representative of a computing device or system in the networked computing environment. A directed connection (e.g., arrowed line) between two nodes represents the access relationship between the nodes. Each node can be representative of a different type of computing device, such as a server, desktop, laptop, handheld, or other type of computing system. The nodes can also be representative of other types of network devices including network switches, routers, firewalls, and other devices. In some cases, the nodes can also be representative of one or more software services executing on one or more computing devices.

An attack graph can also include at least one absorbing or goal state. In the attack graph, it can be possible to go to the goal state node starting from any other state in the attack graph. Therefore, the attack graph can be modeled as an absorbing Markov chain. The absorbing or goal state node is the security node which is exploited by the attacker. When the attacker has reached this goal state, the attack path is completed. Thus, the entire attack graph consists of these type of attack paths.

Figure 4:
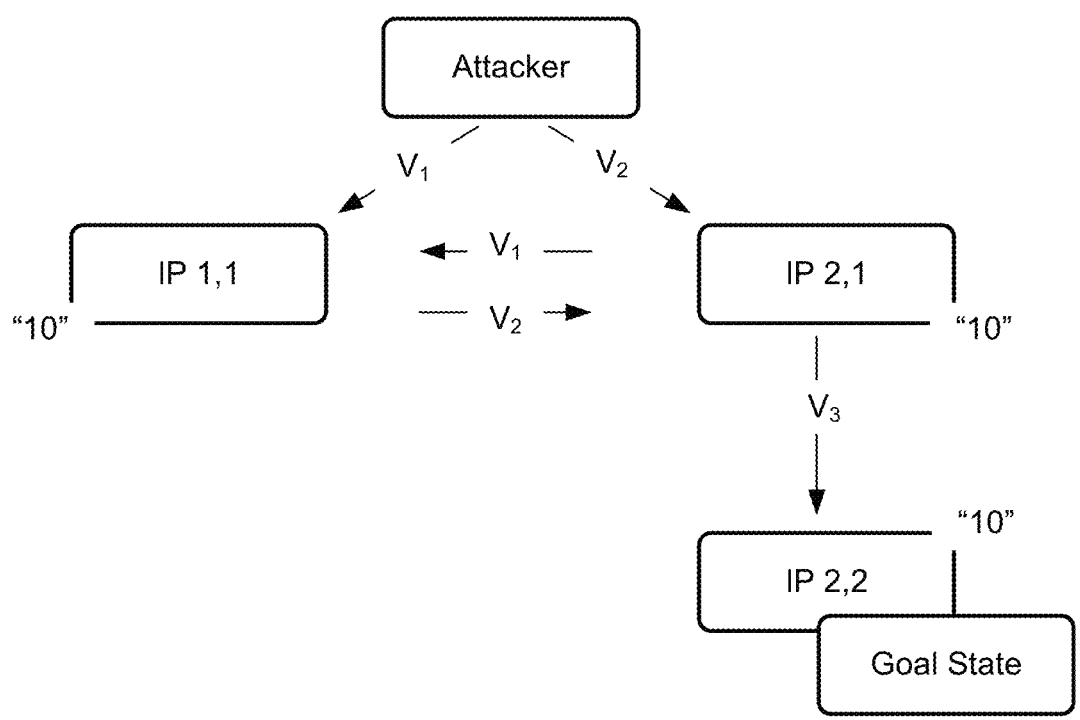
FIG. 4 illustrates an example attack graph according to various examples described herein.

FIG. 4 illustrates an example attack graph according to various examples described herein. The attack graph in FIG. 4 shows all the possible paths that the attacker can follow to reach the goal state node. The computer network system shown in FIG. 4 is provided as a representative example. The concepts described herein can be extended to other computer network systems including more nodes or service hosts and more vulnerabilities.

The attack graph constructor 132 can construct the attack graph shown in FIG. 4 based on the structure and arrangement of the network topology shown in FIG. 3 in this example. The network topology information can be stored in the network data 122, for example, can include serial numbers, model numbers, operating system versions, services, and other identifying information. The network topology information can also specify the logical arrangement of host devices among each other, including the network connections between them. The network topology information can specify a number of hosts in enterprise systems, services running on each host in the network, rules defined on firewalls, network switches, etc., and vulnerabilities associated with each host and service among other topology information. Once the attack graph is constructed by the attack graph constructor 132, then the basic foundation is developed for further analysis by the state transition matrix developer 134, the path length estimator 136, the number of step estimator 137, and the model developer 138.

The attack graph for the computer network system shown in FIG. 4 has two service hosts, IP1 and IP2, and the workstation of an attacker. The attacker can connect to the service hosts via a central router, for example. The service host IP1 has one vulnerability, $V_1$, while the service host IP2 has 2 vulnerabilities, $V_2$ and $V_3$. Table 1 presents the base scores of the vulnerabilities in the attack graph for the computer network system shown in FIG. 4.

TABLE 1

| Base Scores of Vulnerabilities | |
|---|---|
| Vulnerability | Base Score |
| $V_1$ (CVE-2009-0230) | 9 |
| $V_2$ (CVE-2008-5684) | 5 |
| $V_3$ (CVE-2010-4158) | 2.1 |

The IP1,1 state represents the $V_1$ vulnerability and the IP2,1 and IP2,2 states represent the $V_2$ and $V_3$ vulnerabilities, respectively. The IP2,2 state represents the at least one absorption or goal state (i.e., the node to be exploited by the attacker). Also, the notation "10" represents the maximum vulnerability score and this provides attacker the maximum chance to exploit this state. The attacker can reach each state by exploiting the relevant vulnerability. In FIG. 4, an attacker can reach the goal state node by exploiting the $V_2$ vulnerability and the $V_3$ vulnerability.

Given the attack graph shown in FIG. 4, the state transition matrix developer 134 can develop or construct a state transition probability matrix based, for example, on the CVSS score of each of the vulnerabilities in the attack graph. The state transition matrix can be used to evaluate the probabilities that an attacker will transition among the state nodes in the attack graph based on the vulnerabilities. The transition probabilities among the state nodes can be estimated through an absorbing Markov chain by normalizing the CVSS scores over all the edges starting from the source state node of the attacker.

The states of the computer network system shown in FIG. 4 are: $s_1$—the attacker, $s_2$—(IP1, 1), $s_3$—(IP 2,1) and $s_4$—(IP2,2), the goal state. CVSS scores are used for each vulnerability presented in the attack graph. By normalizing these scores for each transition between states, the state transition matrix developer 134 can estimate for transition probabilities as follows:

$$P_{i,j} = \frac{v_j}{\sum_{k=1}^{n} v_k}, \tag{4}$$

where $P_{i,j}$ is the probability that the attacker will explore the vulnerability in state "i" while being in state "j" of the attack graph, n is the number of outgoing edges from state "i" to state "j", and $v_j$ is the CVSS score for the vulnerability in state "j".

These separate probabilities help to obtain the absorbing probability matrix P that lists all the probabilities of any possible single step attack. That is, it shows the reachability of the attacker in a 1-step distance. The state transition matrix developer 134 is then configured to normalize (e.g., by using weights or other normalization factors) the value of exploiting each vulnerability from a given state to another state by dividing the vulnerability score by the sum of all outgoing vulnerability values. For example, the weighted value of exploiting $V_1$ from $s_1$ to $s_2$ is $$\frac{V_1}{V_1 + V_2},$$

and the weighted value or exploiting $V_2$ from $s_1$ to $s_3$ is $$\frac{V_2}{V_1 + V_2},$$

and so on. Eventually, the entire Adjacency Matrix of the attack graph is obtained by state transition matrix developer 134 and is given by:

$$P = \begin{bmatrix} 0 & \frac{V_1}{V_1+V_2} & \frac{V_2}{V_1+V_2} & 0 \\ \frac{0}{10+V_2} & \frac{10}{10+V_2} & \frac{v_2}{10+V_2} & \frac{1}{10+V_2} \\ \frac{0}{V_1+V_3+10} & \frac{v_1}{V_1+V_3+10} & \frac{10}{V_1+V_3+10} & \frac{V_3}{V_1+V_3+10} \\ 0 & 0 & 0 & 1 \end{bmatrix}. \tag{5}$$

The state transition matrix developer 134 can then replace $V_1$, $V_2$, and $V_3$ in the transition probability matrix by the actual CVSS scores to obtain numerical values in P. By utilizing the vulnerabilities information given in Table 1, the state transition matrix developer 134 can obtain the transition probability matrix, P, of the attack graph shown in FIG. 4 as follows:

$$P = \begin{bmatrix} 0 & 0.6429 & 0.3571 & 0 \\ 0 & 0.6667 & 0.3333 & 0 \\ 0 & 0.4265 & 0.4739 & 0.0995 \\ 0 & 0 & 0 & 1 \end{bmatrix} \quad (6)$$

The transition probability matrix P can be referenced to answer some important questions in security. Each value in the transition probability matrix P represents a probability estimate to exploit a related vulnerability in the computer network system. For example, 0.6429 represents the probability that the attacker exploits $V_1$ in a first step, which means moving from $s_1$ to $s_2$ in the attack graph shown in FIG. 4. The probability estimate that the attacker exploits $V_3$ and therefore breaks the network system (reaching the goal state) is 0.0995, moving from $s_3$ to $s_4$.

According to aspects of the embodiments, the CVSS scores were changed and the transition probability matrix P was calculated for each combination of $V_1$, $V_2$, and $V_3$. The path length estimator 136 is then configured to calculate the EPL (i.e. expected number of steps) that the attacker will take to breach the computer network system starting from the initial state in the attack graph shown in FIG. 4. The number of step estimator 137 is also configured to calculate the number of steps that the attacker will take to breach the system starting from the initial state in the attack graph. Using these calculations, the model developer 138 is configured to develop additional statistical models that predict the expected path length and number of steps of the attacker. An example statistical model, in terms of $R^2$ (coefficient of determination), $R^2_{adj}$ ($R^2$–adjusted), is presented in Table 2.

TABLE 2

Statistical Model to Estimate EPL as a Function of Network Vulnerabilities

| Model Equation | $R^2$ | $R^2_{adj}$ |
|---|---|---|
| Y ($V_1$, $V_2$, $V_3$) = 70.62 + 5.338$V_1$ − 14.108$V_2$ − 33.144$V_3$ − 0.041$V_1V_2$ + 0.942 $V_1V_3$ + 3.943$V_2V_3$ − 0.015$V_1^2$ + 0.864$V_2^2$ + 1.814$V_3^2$ − 0.35$V_1V_2V_3$ | 0.943 | 0.9378 |

In Table 2, Y($V_1$, $V_2$, $V_3$) is the EPL for the attacker to exploit the computer network system security (reaching the goal state) starting from the initial state in the attack graph, and ($V_1$, $V_2$, and $V_3$) are the vulnerability scores of the systems in the subject network. The $R^2$ and $R^2_{adj}$ values show the quality of the model. The accounts for the interaction between all 3 vulnerabilities, which helps the security specialists to evaluate the network security not only using the individual vulnerabilities but also their interactions. The $R^2$ criteria can also be used to rank the attributable variables (vulnerabilities), along with the significant interactions according to their contribution to estimate the EPL, as given by Table 3.

TABLE 3

Ranking Variables According to Contribution

| Parameter | Rank |
|---|---|
| $V_3^2$ | 1 |
| $V_3$ | 2 |
| $V_2$ | 3 |
| $V_2^2$ | 4 |
| $V_2V_3$ | 5 |
| $V_1V_2V_3$ | 6 |

TABLE 3-continued

Ranking Variables According to Contribution

| Parameter | Rank |
|---|---|
| $V_1$ | 7 |
| $V_1V_3$ | 8 |
| $V_1V_2$ | 9 |
| $V_1^2$ | 10 |

As shown in Table 3, the third vulnerability in quadratic form ($V_3^2$) is contributing the most to the estimate of the EPL, followed by the third vulnerability ($V_3$). The quadratic form of the first vulnerability ($V_1^2$) is contributing the least to the subject model.

The interactions and contributions can be further evaluated by the model engine 130 by changing the CVSS scores and calculating the minimum number of steps that the attacker will need to breach the computer network system with high probability. The number of step estimator 137 and the model developer 138 can also develop statistical models using these calculations to predict the minimum number of steps to reach the goal state with high probability. An example statistical model, in terms of $R^2$ (coefficient of determination) and $R^2_{adj}$ ($R^2$–adjusted), is presented in Table 4.

TABLE 4

Statistical Models to Estimate Minimum Number of Steps to Reach Goal State

| Model Equation | $R_2$ | $R_{adj}^2$ |
|---|---|---|
| Y($V_1$, $V_2$, $V_3$) = 689.84 + 51.177$V_1$ − 138.815$V_2$ − 328.093$V_3$ − 0.3626$V_1V_2$ + 9.29$V_1V_3$ + 39.114$V_2V_3$ − 0.084$V_1^2$ + 8.479$V_2^2$ + 17.96$V_3^2$ − 3.47$V_1V_2V_3$ | 0.9428 | 0.9376 |

In Table 4, Y($V_1$, $V_2$, $V_3$) is the minimum number of steps for the attacker to reach the goal state with high probability, and ($V_1$, $V_2$, and $V_3$) are the vulnerability scores of the systems in the subject network. The $R^2$ and $R^2_{adj}$ values show the quality of the model. The model also accounts for the interaction between all 3 vulnerabilities, which assists the security administrators to evaluate the network security status with the vulnerabilities interactions.

The CVE and NVD databases can be used to collect vulnerabilities of operating systems and other computer and network components. Below, processes for employing the statistical models of the expected time for a hacker to exploit the computer network system and the minimum number of steps for a hacker to exploit the system with high probability, respectively, as described. The expected time for the computer network system to be compromised can be calculated using the CVE and NVD databases and the statistical models described herein. The minimum number of steps for a hacker to compromise the computer network system can also be calculated using the CVE and NVD databases and the statistical models described herein.

Parametric and non-parametric analysis involve identifying the probabilistic behavior of the expected path length for a hacker to compromise the network system, and the minimum number of steps it would take him/her to hack the network with high probability. According to the embodiments, the model engine 130 is configured to define a probability density function (PDF) that follows or tracks the probabilistic behavior of the hacking time. Anderson-Darling, Cramérvon-Mises, and Kolmogorov-Smirnov goodness of fit tests, for example, can be used to identify the subject PDF, although other tests can be used. Each hypothesis test has a null hypothesis that the underlying probabilistic behavior of the data is explained by the target distribution, at 0.05 level of significance. In some cases, the model engine 130 may not find a well-defined PDF that fits the data in hand. In such cases, the model engine 130 can examine alternative approaches, including non-parametric approaches, such as the kernel density estimation or kernel distribution function approach described below.

Let $x_1, x_2, \ldots, x_i$ represents independent and identical distributed random variables having a common probability density function (PDF), $f(x)$. The kernel density estimation of $f(x)$ is given by:

$$\hat{f}_n(x) = \frac{1}{nh}\sum_{i=1}^{n} K\left(\frac{x-x_i}{h}\right), \quad (7)$$

where $K(u)$ is the kernel function and h is a positive number called the bandwidth. The kernel function is usually required to meet the following conditions:

$$\int_{-\infty}^{+\infty} (K(u))du = 1,$$

$$\int_{-\infty}^{+\infty} u \cdot (K(u))du = 0, \text{ and } \int_{-\infty}^{+\infty} u^2 \cdot (K(u))du \geq 0.$$

Table 6, below, shows some commonly used kernel functions, and the model engine 130 can prepare various models using the kernel functions shown in Table 6, among others. The model engine 130 can also evaluate and select one or more of the kernel functions shown in Table 6.

As one example, the kernel density estimate of the cumulative density function (CDF) for the given random variables with a common PDF, $f(x)$, is defined by:

$$\hat{F}_n(x) = \frac{1}{nh}\sum_{i=1}^{n} \int_{-\infty}^{x} K\left(\frac{y-x_i}{h}\right)dy. \quad (8)$$

Based on (8), it is observed that kernel density estimation depends on the sample size, bandwidth, and the choice of the kernel function $(K(u))$. The model engine 130 can evaluate and select one or more of the kernel functions shown in Table 6.

TABLE 5

A sample of Sets of Vulnerability Scores, along with Estimates of EPL and MNS

| Set | CVSS$_1$ | CVSS$_2$ | CVSS$_3$ | EPL | MNS |
|---|---|---|---|---|---|
| 1 | 7.5 | 5 | 5 | 7.24 | 57.38 |
| 2 | 4.3 | 4.3 | 5 | 0.15 | 91.54 |
| 3 | 9.3 | 4.3 | 5 | 10.86 | 359.19 |
| 4 | 10 | 4.9 | 10 | 37.97 | 1130.52 |
| 5 | 2.1 | 7.5 | 9.3 | 114.72 | 388.93 |
| 6 | 5 | 7.2 | 7.1 | 40.34 | 325.54 |
| 7 | 7.5 | 4.9 | 9.3 | 34.34 | 400.16 |
| 8 | 6.8 | 10 | 5.4 | 41.67 | 713.20 |
| 9 | 2.1 | 7.5 | 7.5 | 72.65 | 38.01 |

TABLE 5-continued

A sample of Sets of Vulnerability Scores, along with Estimates of EPL and MNS

| Set | CVSS$_1$ | CVSS$_2$ | CVSS$_3$ | EPL | MNS |
|---|---|---|---|---|---|
| 10 | 4.9 | 2.1 | 9.3 | 5.27 | 667.33 |
| 11 | 6.8 | 6.8 | 10 | 68.65 | 42.44 |
| 12 | 6.6 | 4 | 4.7 | 5.72 | 156.03 |
| 13 | 6.6 | 5.5 | 7.2 | 17.08 | 584.97 |
| 14 | 6.8 | 7.2 | 9.3 | 60.31 | 70.04 |
| 15 | 7.2 | 4.3 | 6.8 | 8.55 | 157.62 |
| 16 | 6.8 | 7.5 | 5 | 17.19 | 1003.03 |
| 17 | 4 | 7.1 | 10 | 102.15 | 338.12 |

TABLE 6

Commonly used Kernel Functions

| Kernel functions (K(u)) | Expression |
|---|---|
| Gaussian | $\frac{1}{\sqrt{2}}\exp\left(\frac{-u^2}{2}\right)I_R$ |
| Epanechnikov | $\frac{3}{4}(1-u^2)I_{\{|u|\leq 1\}}$ |
| Uniform | $\frac{1}{2}I_{\{|u|\leq 1\}}$ |
| Triangular | $(1-|u|)I_{\{|u|\leq 1\}}$ |
| Triweight | $\frac{35}{32}(1-u^2)^3 I_{\{|u|\leq 1\}}$ |
| Biweight | $\frac{15}{16}(1-u^2)^2 I_{\{|u|\leq 1\}}$ |
| Tricube | $\frac{70}{81}(1-|u|^3)^3 I_{\{|u|\leq 1\}}$ |
| Cosine | $\frac{\pi}{4}\cos\left(\frac{\pi}{2}u\right)$ |

Figure 5:
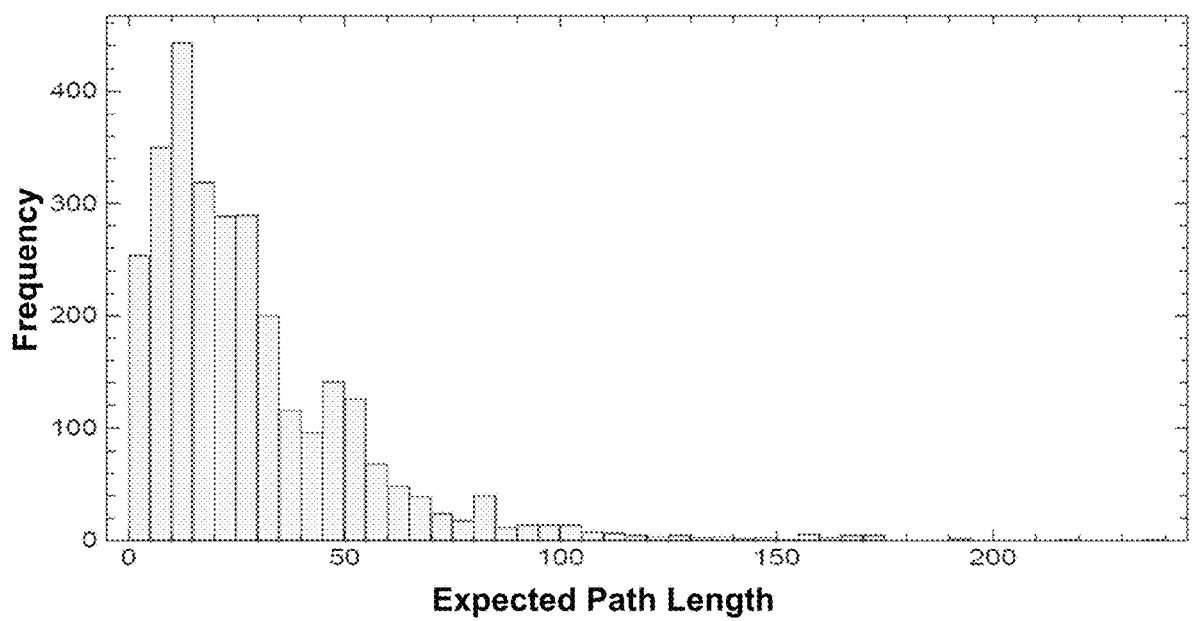
FIG. 5 illustrates a histogram of expected path length against frequency according to various aspects of the embodiments described herein.

As described above, the expected path length for the computer network system to be hacked can be separately and iteratively calculated by the path length estimator 136. FIG. 5 illustrates a histogram of the expected path length against frequency calculated by the path length estimator 136 according to various aspects of the embodiments described herein. In the example shown, at the end of the calculation process by the model engine 130, the total number of calculated expected path lengths was 2,980. The histogram of the expected path length data for hacking the network system indicates skewness to the right.

Based in part on the data in the histogram shown in FIG. 5, the model developer 138 can apply data transformation techniques to the data, in an effort to find a probability distribution that best fits the expected path length data. The model developer 138 can also apply data transformation techniques to find a parametric probability distribution function, or a mixture of parametric probability distribution functions, that best fit the expected path length data. Further, the model developer 138 can conduct goodness of fit tests to identify the functions that fit the expected path length data. Thus, the model developer 138 is configured to apply the goodness of fit tests of the expected path length data against a mixture of probability distributions and parametric probability distributions.

As one example, the model developer 138 is configured to apply a mixture of Gamma ($\alpha,\beta$) and LogNormal ($\mu,\sigma$) parametric probability distributions to fit the data, although other mixtures of different parametric probability distributions can be applied. The model developer 138 can also test the Anderson-Darling and Cramérvon-Mises goodness of fit tests to confirm the fit of the parametric probability distributions, with p-values=0.10 and 0.13, respectively.

The PDF of a mixture of the Gamma and LogNormal probability distributions can be written by:

$$f(x) = \sum_{i=1}^{2} w_i \cdot f_i(x), \quad (9)$$

where $w_i$ are weights such that $w_i \geq 0$ and $\Sigma w_i = 1$ and $f_1(x)$ and $f_2(x)$ are PDFs of Gamma and LogNormal probability distributions, respectively.

Thus, the PDF of the mixture of Gamma and LogNormal probability distributions that approximately fit the expected path length data ($\hat{f}_{EPL}(x)$) for a hacker to compromise the network system is simplified and given by:

$$\hat{f}_{EPL}(x) = \begin{cases} \dfrac{e^{-\frac{x}{\beta}} w_1 \beta^{-\alpha} x^{\alpha-1}}{(w_1+w_2)\Gamma(\alpha)} + \dfrac{e^{-\frac{(\log(x)-\mu)^2}{2\sigma^2}} w_2}{\sqrt{2\pi}(w_1+w_2)\sigma x}, & x > 0, \\ 0, & \text{Otherwise} \end{cases} \quad (10)$$

where $\alpha$ and $\beta$ represent the shape and scale parameters of the Gamma probability distribution, respectively, and $\mu$ and $\sigma$ represent the mean and standard deviation of the LogNormal probability distribution, respectively. Whereas $w_1$ and $w_2$ are the weighting parameters of the mixture of the two probability distributions. The CDF of the mixture of Gamma and LogNormal distributions can be simplified and given by:

$$\hat{F}_{EPL}(x) = \begin{cases} \dfrac{W_2 \cdot \text{Erfc}\left(\dfrac{\mu-\log(x)}{\sqrt{2}\sigma}\right)}{2(w_1+w_2)} + \dfrac{w_1 Q\left(\alpha, 0, \dfrac{x}{\beta}\right)}{w_1+w_2}, & x > 0, \\ 0, & \text{Otherwise} \end{cases} \quad (11)$$

where Erfc( ) is the complementary error function $$Erfc = (x)\frac{2}{\sqrt{\pi}} \int_x^\infty e^{-z^2} dz,$$

and Q( ) is the regularized incomplete gamma function:

$$Q\left(\alpha, 0, \frac{x}{\beta}\right) = \frac{\gamma\left(\alpha, \frac{x}{\beta}\right)}{\Gamma(\alpha)}.$$

The mixture of Gamma and LogNormal probability distributions fit the expected path length data well.

Figure 6:
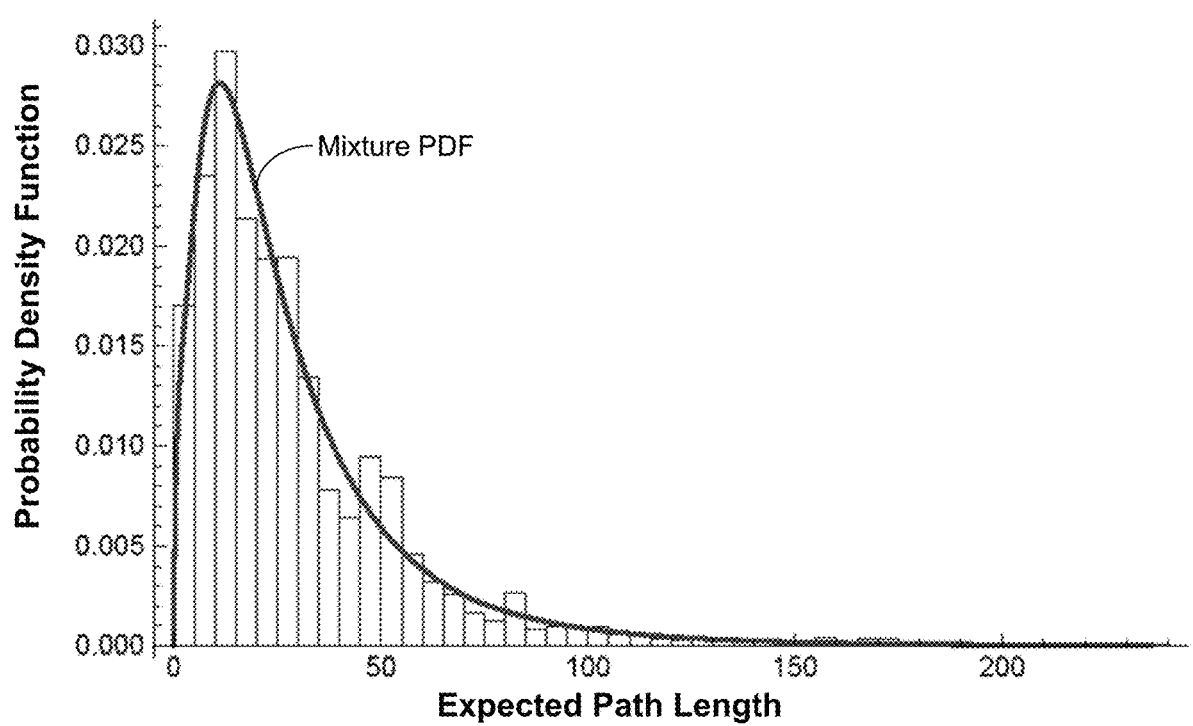
FIG. 6 illustrates a Probability Distribution Function (PDF) of a mixture of Gamma and LogNormal distribution curves along with the histogram of the expected path length data shown in FIG. 7 according to various aspects of the embodiments described herein.

FIG. 6 illustrates a PDF of a mixture of Gamma and LogNormal distribution curves generated by the model developer 138, along with the histogram of the expected path length data shown in FIG. 5, according to various aspects of the embodiments described herein. The defined PDF of the mixture of the subject probability distributions can be helpful to answer important questions in cybersecurity analysis. For example, what is the probability of the comptuer network system with a random set of vulnerabilities will have an expected path length for an attacker to hack the network between 80 and 90 days (or any other time unit)? The answer can be calculated by the model engine 130 by integrating the $\hat{f}_{EPL}(x)$ from 80 to 90 after evaluating it at the approximate maximum likelihood estimates of the parameters in Table 7, namely $\alpha,\beta,\mu,\sigma$, $w_1$, and $w_2$, and given by:

$$\int_{80}^{90} 0.0134 \cdot e^{-0.197x} \times^{0.592} + \frac{0.445 \cdot e^{-0.889(\log(x)-3.237)^2}}{x} dx = 0.014. \quad (12)$$

Therefore, the estimate of the required probability is $\hat{p}=0.014$.

TABLE 7

Approximate Maximum Likelihood Estimates (MLEs) of the $\hat{f}_{EPL}(x)$ Parameters.

| Parameter | MLE |
| --- | --- |
| w1 | 0.16 |
| w2 | 0.84 |
| $\alpha$ | 1.59 |
| $\beta$ | 5.08 |
| $\mu$ | 3.24 |
| $\sigma$ | 0.75 |

Figure 7:
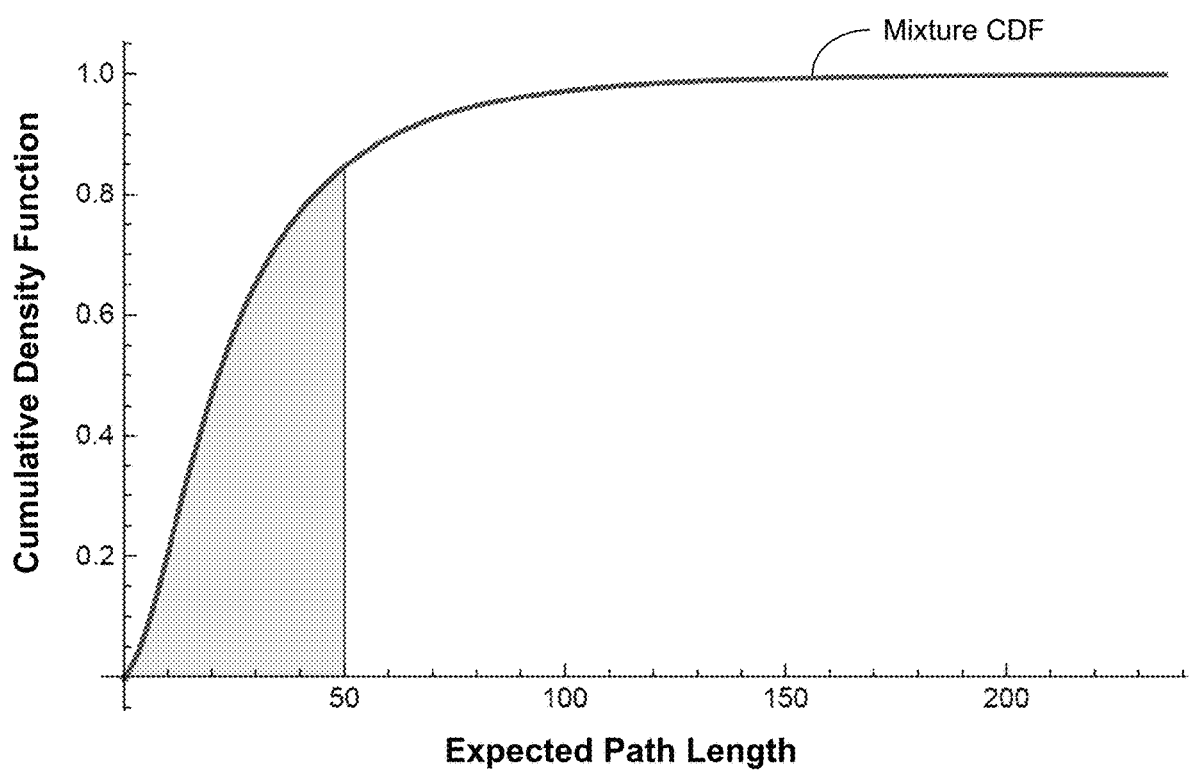
FIG. 7 illustrates a Cumulative Distribution Function (CDF) of a mixture of Gamma and LogNormal distribution curves of the expected path length data shown in FIG. 5 according to various aspects of the embodiments described herein.

The CDF of the mixture of the parametric probability distributions of the expected path length data can also be useful in computing the cumulative probabilities. FIG. 7 illustrates a CDF of a mixture of Gamma and LogNormal distribution curves generated by the model developer 138. As one example, the shaded area under the CDF curve in FIG. 7 represents approximately $\hat{p}=0.846$, which is the cumulative probability of the computer network system with a random set of vulnerabilities that will have an expected path length for an attacker to hack the network from the first time unit t=1 up to the $50^{th}$ time unit.

Parametric modeling of data is a powerful analysis tool as compared to non-parametric modeling, especially when the underline probability distribution is correctly identified. To eliminate any possibilities that the goodness of fit tests might misclassify the probability distribution, and to give cybersecurity specialists more options on modeling the expected path length data, the model developer 138 is also configured to apply one or more kernel density estimations as non-parametric approach.

The kernel density estimation depends on the sample size, bandwidth, and the choice of the kernel function (K(u)). According to the embodiments, the model developer 138 can select the optimal bandwidth (h*) and kernel function to minimize the asymptotic mean integrated squared error (AMISE). The simplified form of the AMISE can be reduced to:

$$AMISE(\hat{f}(x)) = \frac{C(K)}{n \cdot h} + \left(\frac{1}{4} \cdot h^4 \cdot k_2^2 \cdot R(f^{(2)}(x))\right), \quad (13)$$

where: $C(K)=\int (K(u))^2 du$, n is sample size, h is bandwidth, $$k_2 = \int_{-\infty}^{+\infty} u^2 \cdot K(u) du, \quad f^{(2)}(x)$$

is the second derivative of f(x), $R(f^{(2)}(x))=\int (f^{(2)}(x))^2 dv$, and $$h^* = \left[\frac{C(k)}{k_2^2 \cdot R(f^{(2)}(\beta))}\right]^{1/5} \cdot n^{-1/5}.$$

AMISE depends on four entities, namely kernel function, bandwidth, sample size, and the target density f(x). The bandwidth and the kernel function can be controlled by model developer 138. By fixing the kernel function and using the optimal bandwidth (h*), an optimal AMISE can be obtained as:

$$AMISE_{optima} = \frac{5}{4} \cdot \left(\sqrt{k_2} \cdot C(k)\right)^{\frac{4}{5}} \cdot C(f^{(2)})^{\frac{1}{5}} \cdot n^{\frac{-4}{5}}. \quad (14)$$

The model developer 138 can then chose the optimal kernel function so that $AMISE_{optimal}$ is the minimum. Particularly, the model developer 138 can chose the optimal kernel function by minimizing ($\sqrt{k_2} \cdot C(K)$) without knowing the target PDF f(x). The Epanechnikov kernel function has the minimum value among other kernel functions (as in Table 6), which is given by:

$$K_{Epan} \cdot (u) = \frac{3}{4}(1 - u^2), (|u| \leq 1). \quad (15)$$

Therefore, the kernel density estimates of the PDF and the CDF of the expected path length data for the computer network system to be hacked, $\hat{f}_n(x)$ and $\hat{F}_n(x)$, respectively, are given by:

$$\hat{f}_n(x) = \frac{1}{(2980 * 3.53)} \sum_{i=1}^{2980} K_{Epan} \cdot \left(\frac{x - x_i}{3.53}\right), \quad (16)$$

and $$\hat{F}_n(x) = \frac{1}{(2980 * 3.53)} \sum_{i=1}^{2980} \int_{-\infty}^{x} K_{Epan} \cdot \left(\frac{x - v_i}{3.53}\right) dx. \quad (14)$$

Figure 8:
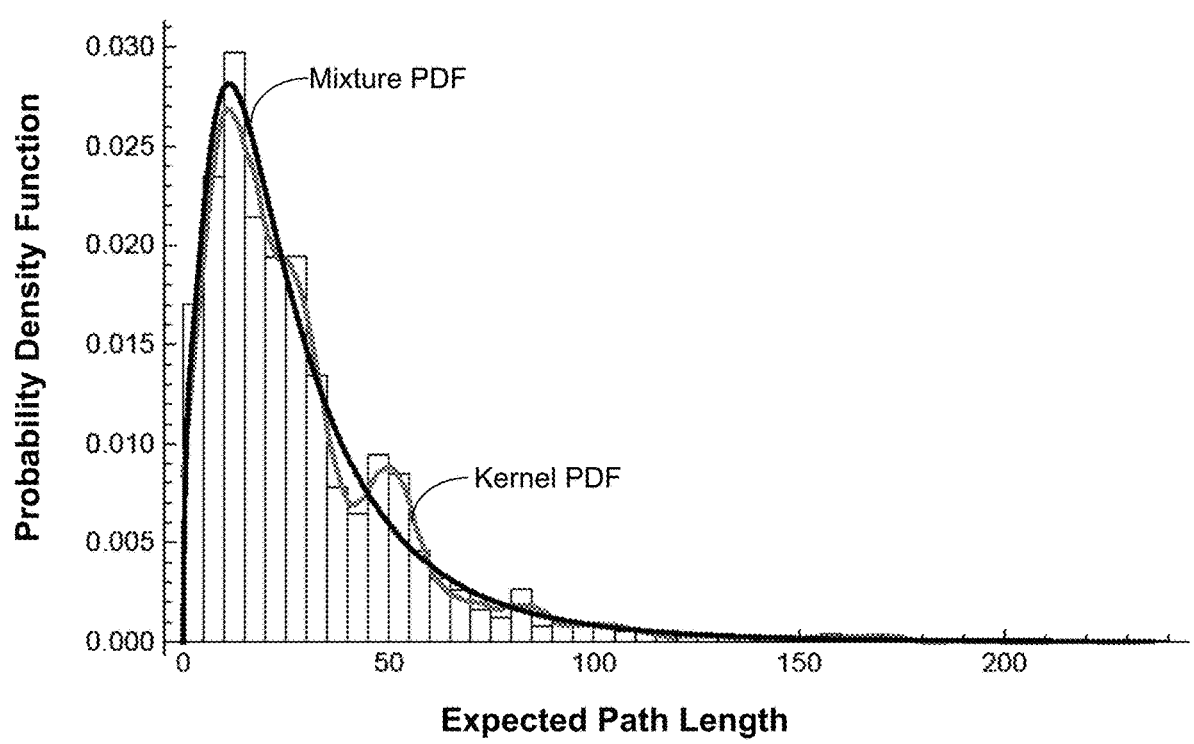
FIG. 8 illustrates a PDF of the mixture of Gamma and LogNormal distribution curves and a PDF of the kernel along with the histogram of the expected path length data shown in FIG. 7 according to various aspects of the embodiments described herein.

FIG. 8 illustrates a histogram of the expected path length data for the computer network system to be hacked, along with curves of the mixture and kernel PDFs. There are 2,980 expected path lengths computed for the data shown in FIG. 8. In FIG. 8, both of the mixture and kernel PDFs are a good fit to the expected path length data. The parametric modeling approach that resulted in defining the mixture of the subject probability distributions is recommended. The kernel density estimate approach gives the cybersecurity administrator another approach to better characterize the probabilistic behavior of the expected path length data of their network system, especially when it is not possible to define a parametric probability distribution.

Figure 9:
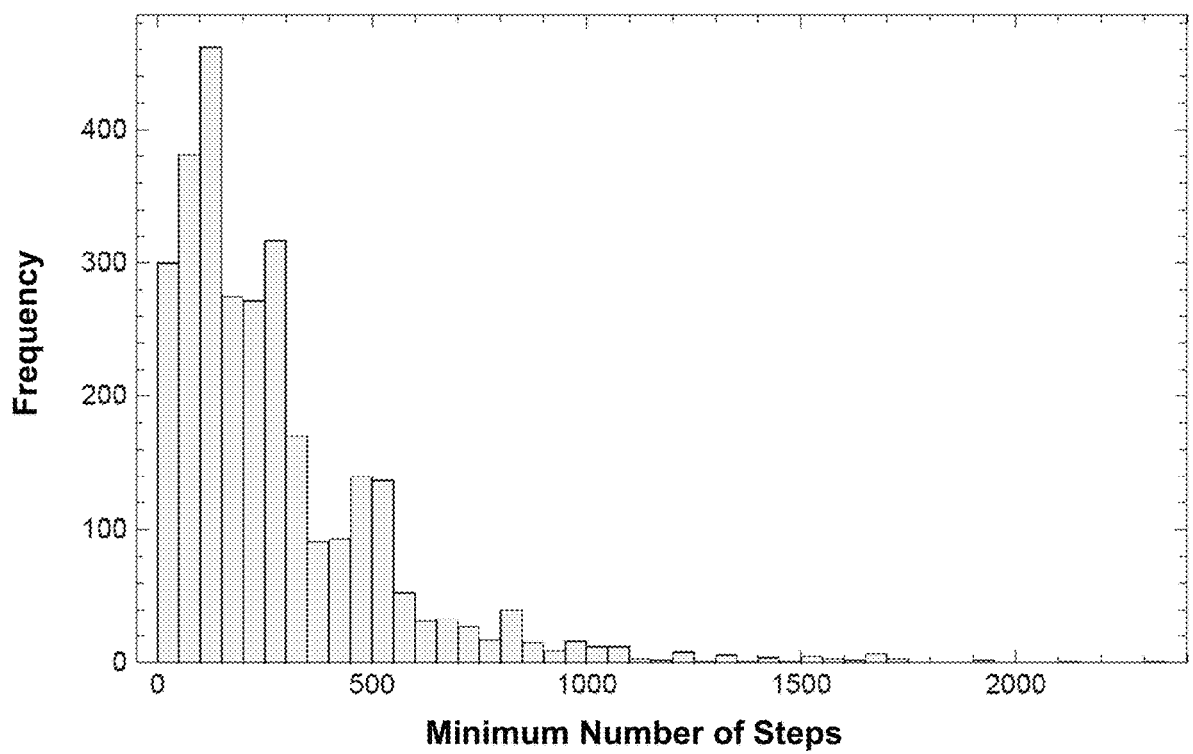
FIG. 9 illustrates a histogram of minimum number of steps data against frequency according to various aspects of the embodiments described herein.

In other aspects of the embodiments, the minimum number of steps for the computer network system to be hacked with high probability can also be calculated by the number of step estimator 137 using the statistical models described herein. FIG. 9 shows the histogram of the data. By the end of the calculation process, the total number of expected path lengths calcualted was 2,953. The histogram indicates skewness to the right.

Based in part on the data in the histogram shown in FIG. 9, the model developer 138 can apply data transformation techniques to the data, in an effort to find a probability distribution that best fits the minimum number of steps data. The model developer 138 can also apply data transformation techniques to find a parametric probability distribution function, or a mixture of parametric probability distribution functions, that best fit the minimum number of steps data. Further, the model developer 138 can conduct goodness of fit tests to identify the functions that fit the minimum number of steps data. Thus, the model developer 138 is configured to apply the goodness of fit tests of the minimum number of steps data against a mixture of probability distributions and parametric probability distributions.

As one example, the model developer 138 is configured to apply a mixture of Gamma ($\alpha,\beta$) and LogNormal ($\mu,\sigma$) parametric probability distributions to fit the data, although other mixtures of different parametric probability distributions can be applied. The model developer 138 can also test the Anderson-Darling and Cramervon-Mises goodness of fit tests to confirm the fit of the parametric probability distributions, with p-value=0.16 and 0.19, respectively.

The PDF and CDF of the mixture of Gamma and LogNormal distributions that approximately fit the minimum number of steps data ($\hat{f}_{MNS}(x)$) for a hacker to compromise the network system with high probability is given by equations (10) and (11), respectively.

TABLE 8

Maximum Likelihood Estimates (MLEs) of the Parameters of $\hat{f}_{MNS}(x)$

| Parameter | MLE |
| --- | --- |
| w1 | 0.81 |
| w2 | 0.19 |
| α | 1.57 |
| β | 131.13 |
| μ | 6.23 |
| σ | 0.75 |

Figure 10:
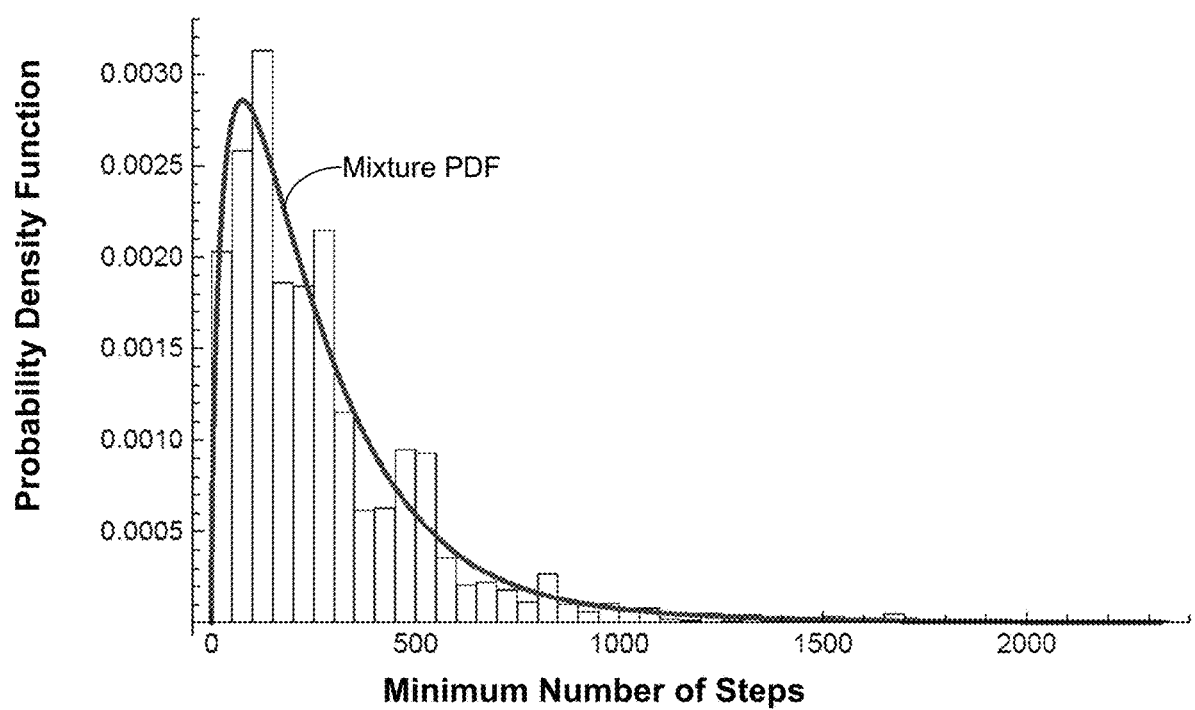
FIG. 10 illustrates a PDF of a mixture of Gamma and LogNormal distribution curves along with the histogram of the minimum number of steps data shown in FIG. 11 according to various aspects of the embodiments described herein.

FIG. 10 illustrates a PDF of a mixture of Gamma and LogNormal distribution curves along with the histogram of the minimum number of steps data shown in FIG. 9. It can be seen that the mixture of Gamma and LogNormal probability distributions fit the minimum number of steps data well.

In other aspects of the embodiments, the model engine 130 can define the hack time of a computer network system as a failure time. With reference to that, the model engine 130 can also calculate the minimum number of steps (or any time unit such as days) for an attacker to hack the computer network system with high probability as the number of steps (or number of days) until a death or failure event occurs for the network with a high probability.

The model developer 138 is configured to construct a reliability function of the computer network system. The reliability function of the minimum number of steps for an attacker to hack the network with a high probability or the minimum number of time unit till a failure event of the computer network system occurs with high probability is given by:

(18)

$$\hat{R}_{MNS}(x) = \int_x^\infty \hat{f}_{MNS}(z)dz =$$

$$\begin{cases} \frac{w_1}{w_1 + w_2} + \frac{w_2}{w_1 + w_2} = 1, & x \leq 0, \\ \frac{w_2 Erfc\left(-\frac{\mu - \log(x)}{\sqrt{2}\sigma}\right)}{2(w_1 + w_2)} + \frac{w_1 Q\left(\alpha, \frac{x}{\beta}\right)}{w_1 + w_2}, & x > 0, \end{cases}$$

where the probability of not being hacked past time 0 is $$\frac{w_1}{w_1+w_2} + \frac{w_2}{w_1+w_2} = 1,$$

Erfc( ) is the complementary error function $$Erfc(x) = \frac{2}{\sqrt{\pi}} \int_c^\infty e^{-z^2} dz,$$

and Q( ) is the regularized incomplete gamma function $$Q\left(\alpha, \frac{x}{\beta}\right) + \frac{\Gamma\left(\alpha, \frac{x}{\beta}\right)}{\Gamma(\alpha)}.$$

Figure 11:
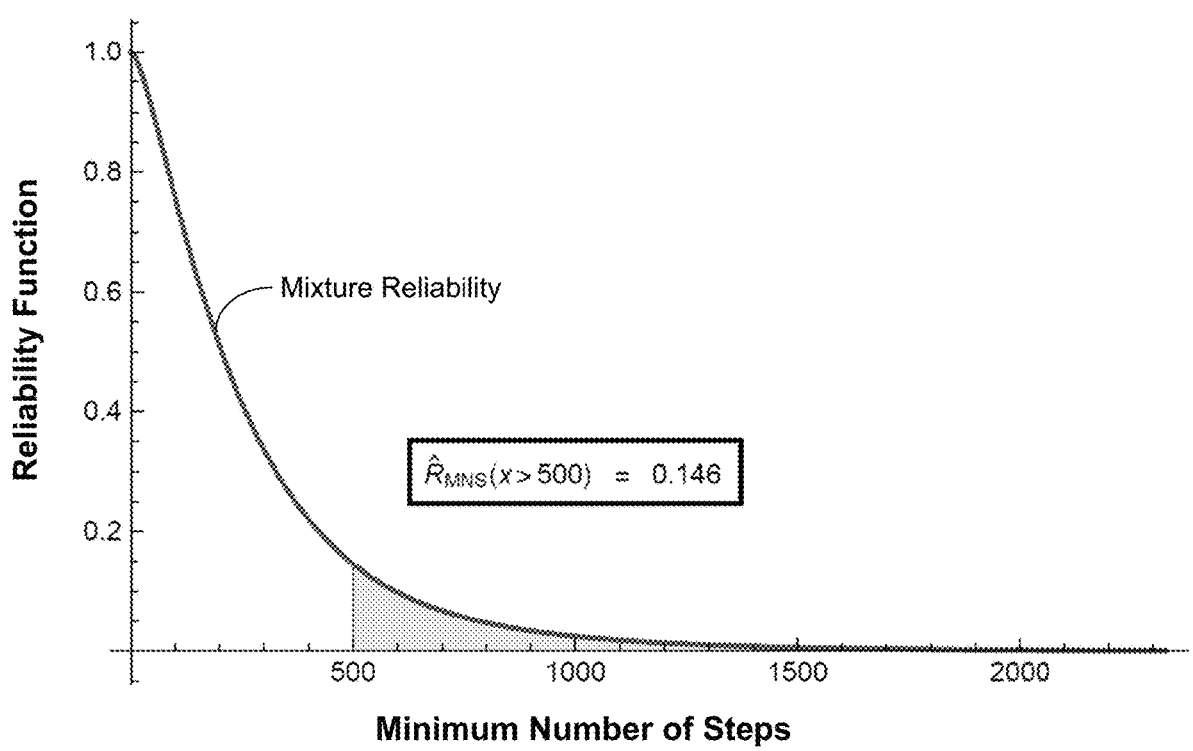
FIG. 11 illustrates a visualization of the reliability function of the minimum number of steps that an attacker needs to compromise the network or the time till the failure of the network system according to various aspects of the embodiments described herein.

FIG. 11 illustrates a visualization of the reliability function of the minimum number of steps that an attacker needs to compromise the network or the time till the failure of the network system according to various aspects of the embodiments described herein. The reliability function of the mixture of the subject probability distributions is very useful to cybersecurity administrators. For example, the shaded area under the curve in FIG. 11 represents the probability estimate ($\hat{R}_{MNS}(x>500)=0.146$) of the selected network system with a random set of vulnerabilities that will not be hacked after 500 unit of time with high probability. Again, this reliability function is for a given computer network system, however, the methodology and analysis are applicable to any desired computer network system.

The parametric data analysis is highly recommended when the underlying probability distribution is appropriately identified. In real world problems such as cybersecurity data, researchers might not be able to find the probability distribution that characterizes the probabilistic behavior of their subject phenomenon. Thus, the embodiments described herein provide a secondary approach by employing the kernel density estimation (non-parametric modeling) of the minimum number of steps for an attacker to hack the network system with high probability.

Again, the minimum number of steps for an attacker to hack the network system with high probability can be defined as the minimum number of time until a failure event of the computer network system occurs with high probability. The kernel density estimates of the PDF and CDF of the minimum number of steps data of hacking the network system with high probability, $\hat{f}_{MNS \cdot n}(x)$ and $\hat{F}_{MNS \cdot n}(x)$ respectively, can be developed by the model developer 138 based on the Epanechnikov kernel function (optimal kernel) and the optimal bandwidth (h*) as:

$$\hat{f}_{MNS \cdot n}(x) = \frac{1}{(2980*35.2)} \sum_{i=1}^{2953} K_{Epan} \cdot \left(\frac{x - x_i}{35.2}\right), \quad (19)$$

and $$\hat{F}_{MNS \cdot n}(x) = \frac{1}{(2980*35.2)} \sum_{i=1}^{2953} \int_{-\infty}^{x} K_{Epan} \cdot \left(\frac{x - v_i}{35.2}\right) dx. \quad (20)$$

Figure 12:
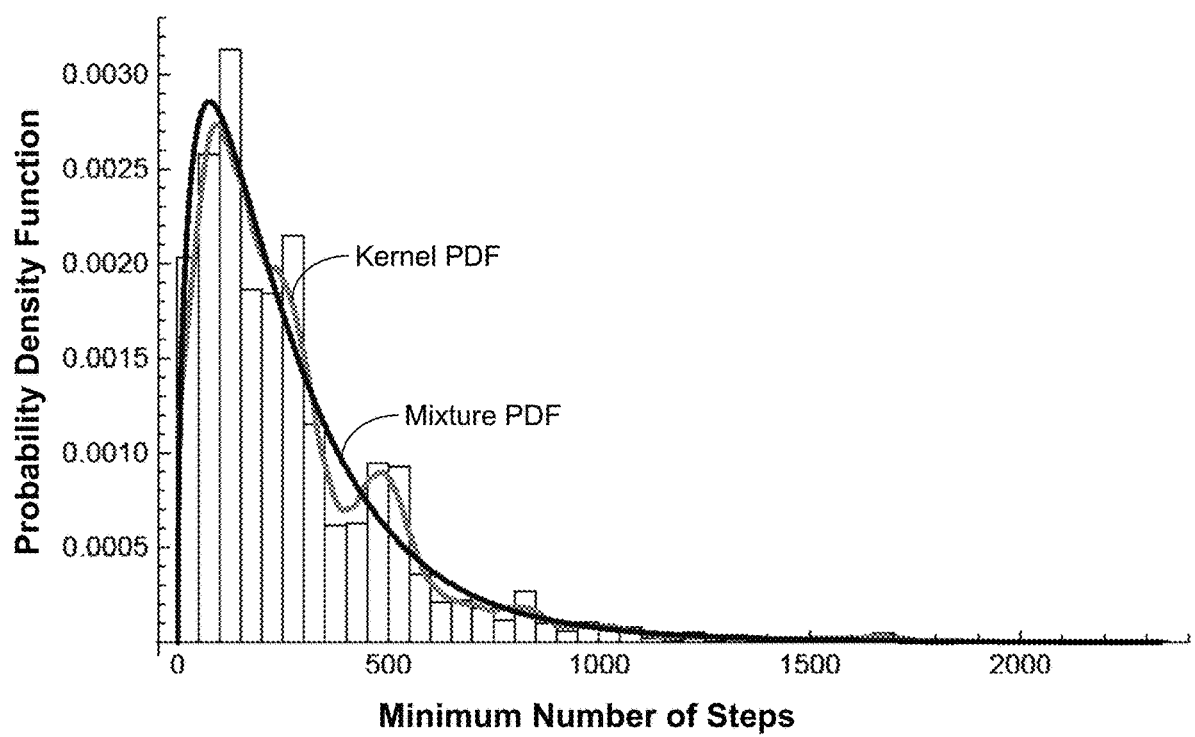
FIG. 12 shows the histogram of the minimum number of steps data of the network system to be hacked with high probability, along with curves of the kernel their PDF and the mixture PDF probability distributions according to various aspects of the embodiments described herein.

FIG. 12 shows the histogram of the minimum number of steps data of the computer network system to be hacked with high probability, along with curves of the kernel PDF of ($\hat{f}_{MNS \cdot n}(x)$) and the mixture PDF of Gamma ($\alpha,\beta$) and LogNormal ($\mu,\sigma$) probability distributions. There are 2,953 minimum number of steps computed in FIG. 12. We can see that the kernel and mixture PDFs are a good fit to the minimum number of steps data in FIG. 12.

The kernel estimate of the reliability function of the minimum number of steps that an attacker needs to compromise the network with high probability ($\hat{R}_{MNS \cdot n}(x)$) is given by:

$$\hat{R}_{MNS \cdot n}(x) = \quad (21)$$

$$1 - \hat{F}_{MNS \cdot n}(x) = 1 - \left(\frac{1}{(2953*35.2)} \sum_{i=1}^{2953} \int_{-\infty}^{x} K_{Epan} \cdot \left(\frac{x - v_i}{35.2}\right) dx\right).$$

Figure 13:
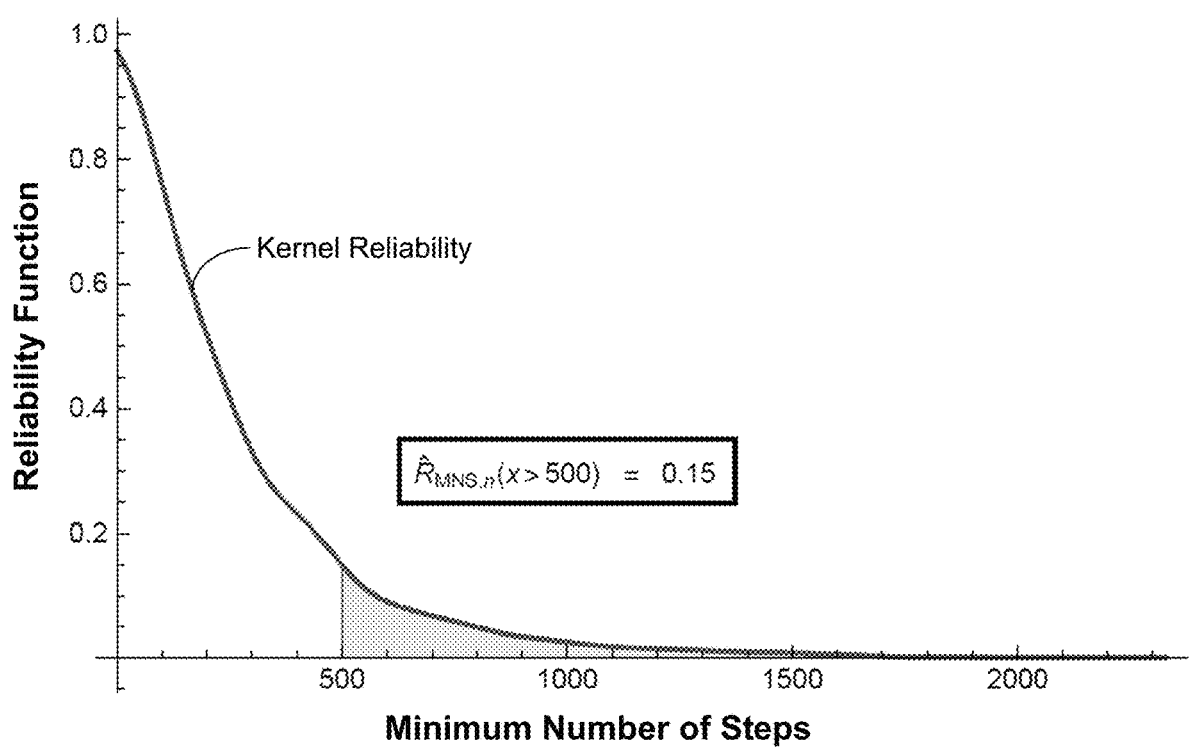
FIG. 13 shows the plot of $\hat{R}_{mns,n}(x)$ against the minimum number of steps according to various aspects of the embodiments described herein.

FIG. 13 shows the plot of $\hat{R}_{MNS \cdot n}(x)$ against the minimum number of steps. The shaded area under the kernel reliability function curve in FIG. 13 represents the probability estimate ($\hat{R}_{MNS}(x>500)=0.15$) of the selected network system with a random set of vulnerabilities that will not be hacked after 500th unit of time with high probability. This reliability estimates is approximately same estimate resulted from the reliability function of the mixture of the subject probability distributions.

Reliability is a very important concept in identifying the quality of a product. Identifying the analytical form of the reliability function depends initially on knowing the failure times of a given product. With this information, it is possible for the model engine 130 to perform parametric, nonparametric, and Bayesian reliability analysis. In developing the analytical form of the reliability function of a given computer network, the model engine 130 can identify the probability distribution that characterizes probabilistically the behavior of n (the minimum number of steps to hack a given computer network). This innovation addresses the question with both parametric and non-parametric models with a high degree of accuracy.

Figure 14:
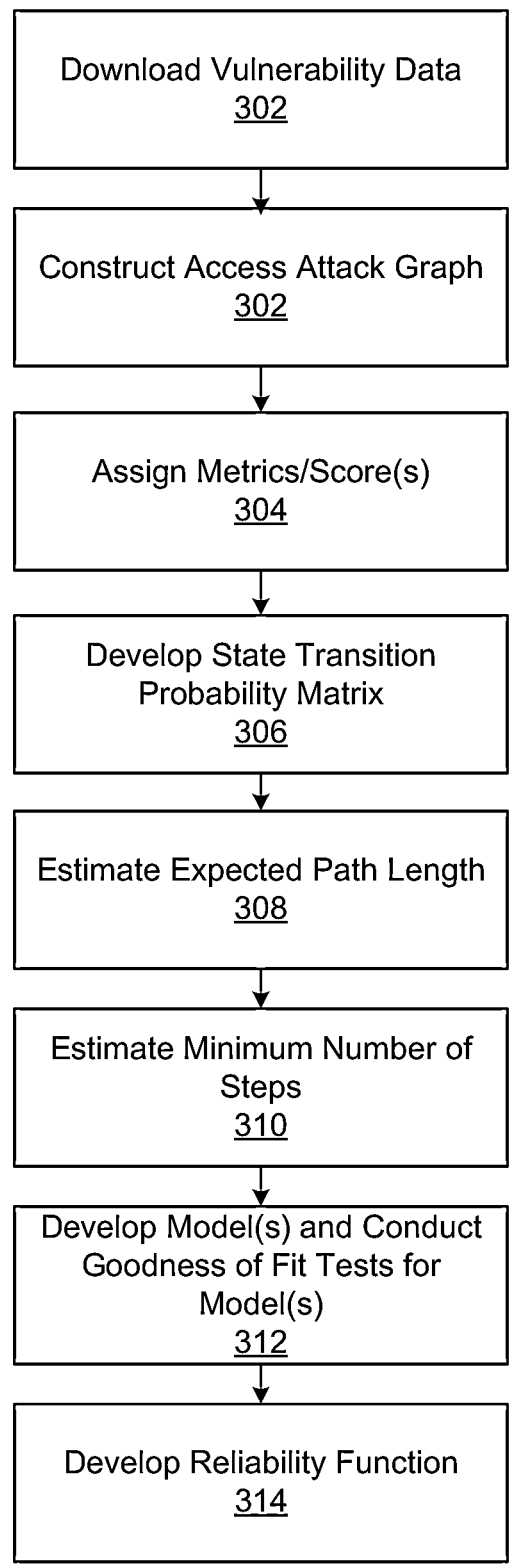
FIG. 14 illustrates a process of developing models and reliability functions according to various aspects of the embodiments described herein.

FIG. 14 illustrates a process for the generation of a number of statistical predictive models, including expected path length, minimum number of steps, probability functions, and reliability functions. The process flowchart in FIG. 14 can be viewed as depicting example steps performed by the computing environment 110, although other computing systems and environments can perform the process. The flowchart in FIG. 14 provides merely one example of a functional sequence or arrangement of steps that can be employed to implement the processes for predictive modeling and risk ranking described herein. Although the processes are described in connection with the computing environment 110, other computing environments, systems, and/or devices can perform the processes. Additionally, although not explicitly stated below, among each of the process steps described, any number of intermediate data accessing, storing, and logging steps can be performed.

At step 300, the process can include the computing environment 110 downloading vulnerability data for a computer network system under review. The vulnerability data can be downloaded form the NVD, for example, or other data sources. The data can be stored as part of the network data 122 and the risk metric data 124 in the data store 120 of the computing environment 110 for processing by the model engine 130. The risk metric data 124 can include a number of risk metrics, including CVSS and CVE data among other risk metric data, associated with the computer network system under review. As one example, according to the CVSS framework, the risk metrics can include base, temporal, and environmental metrics, among others, for the devices specified in the network data 122. However, the risk metric data 124 is not limited to the types of metrics used in the CVSS framework, as other types and formats of risk metrics can be relied upon.

At step 302, the process can include the attack graph constructor 132 constructing a host access attack graph. The host access attack graph can be constructed based on data stored in the network data 122, for example, according to characteristics of the computer network system under review. The host access attack graph can include a plurality of nodes such as those shown in FIG. 4, based on the structure of the network of computing systems shown in FIG. 3, for example.

At step 304, the process can include the state transition matrix developer 134 gathering and assigning security or vulnerability metrics or scores related to one or more of the nodes in the host access attack graph. The metrics may be gathered and assigned from the risk metric data 124 or from another computing system via network communications. As one example, the state transition matrix developer 134 can gather exploitability scores and impact scores associated with the nodes in the host access attack graph. The exploitability and impact scores can be CVSS scores or other scores developed according to another vulnerability scoring system.

At step 306, the process can include the state transition matrix developer 134 developing a state transition probability matrix based on the scores gathered at step 304 and the host access attack graph constructed at step 302. In one example, the state transition matrix developer 134 can develop the state transition probability matrix as described above with reference to the exploitability scores and the impact scores.

At step 308, the process can include the path length estimator 136 estimating an expected path length of an attacker of the computer network system under review based on the state transition probability matrix developed in step 306. The EPL can correspond to a number of steps the attacker will take starting from an initial state node to a goal state node in the attack graph. At step 308, the process can also include the path length estimator 136 ranking the vulnerability associated with each of the plurality of nodes in the attack graph constructed at step 302 among each other with respect to contribution to the EPL. The nodes can be ranked to identify a percentage of contribution to the response (e.g., in terms of the EPL and the minimum number of steps to reach the target), as described above with reference to Table 3, for example. This ranking can be used to take precautionary measures addressing the most dangerous vulnerability or vulnerabilities with priority.

At step 310, the process can include the number of step estimator 137 estimating an expected minimum number of steps for an attacker of the computer network system under review based on the state transition probability matrix developed in step 306. The minimum number of steps can correspond to a number of steps the attacker will take starting from an initial state node to a goal state node in the attack graph.

At step 312, the process can include the model developer 138 developing one or more models based on the expected path length data from step 308 and the number of steps data from step 310. The process can also include the model developer 138 conduct goodness of fit tests to the models, to identify the model functions that fit the data as part of an iterative process. As examples, the model developer 138 can to develop statistical models that predict the expected path length and number of steps of the attacker, as described above, including those shown in Table 2, Table 4, among others.

At step 312, the process can include the model developer 138 applying data transformation techniques to the expected path length data from step 308, in an effort to find a probability distribution that best fits the expected path length data. The model developer 138 can also apply data transformation techniques to find a parametric probability distribution function, or a mixture of parametric probability distribution functions, that best fit the expected path length data. Further, the model developer 138 can conduct goodness of fit tests to identify the functions that fit the expected path length data as part of an iterative process at step 312. Thus, the model developer 138 is configured to apply the goodness of fit tests against a mixture of probability distribution and parametric probability distribution models for the expected path length data.

At step 312, the process can also include the model developer 138 applying data transformation techniques to the number of steps data from step 310, in an effort to find a probability distribution that best fits the number of steps data. The model developer 138 can also apply data transformation techniques to find a parametric probability distribution function, or a mixture of parametric probability distribution functions, that best fit the number of steps data. Further, the model developer 138 can conduct goodness of fit tests to identify the functions that fit the number of steps data as part of an iterative process at step 312. Thus, the model developer 138 is configured to apply the goodness of fit tests against a mixture of probability distribution and parametric probability distribution models for the number of steps data.

At step 314, the process can include the model developer 138 constructing a reliability function of the computer network system under review. The reliability function of the minimum number of steps for an attacker to hack the network can be given by equation (18), for example, or other functions.

The embodiments described herein introduce a definition of reliability in the cybersecurity of computer network systems. Reliability of a computer network system reflects the quality of the network. The analytical models described herein have be, and can be, developed using real data of the NVD, among other data. The analytical models described herein are made up of computer operating systems that represents 99.34% of the existing operating systems in use today. The analytical model can be easily extended to develop reliability structures of the computer operating systems. Knowing the reliability behavior of a given computer network system is of significant importance to: design engineers of a given computer network system, testing engineers prior to mass production, marketing directors that can attest to how reliable computer network systems are, directors that monitors competitive analysis, and information technology directors that utilize a specific computer network to monitor its quality, among others. Although the examples described above were based on a computer network system of two systems and three vulnerabilities, it can be generalized to a computer network system with any number of system components.

Figure 15:
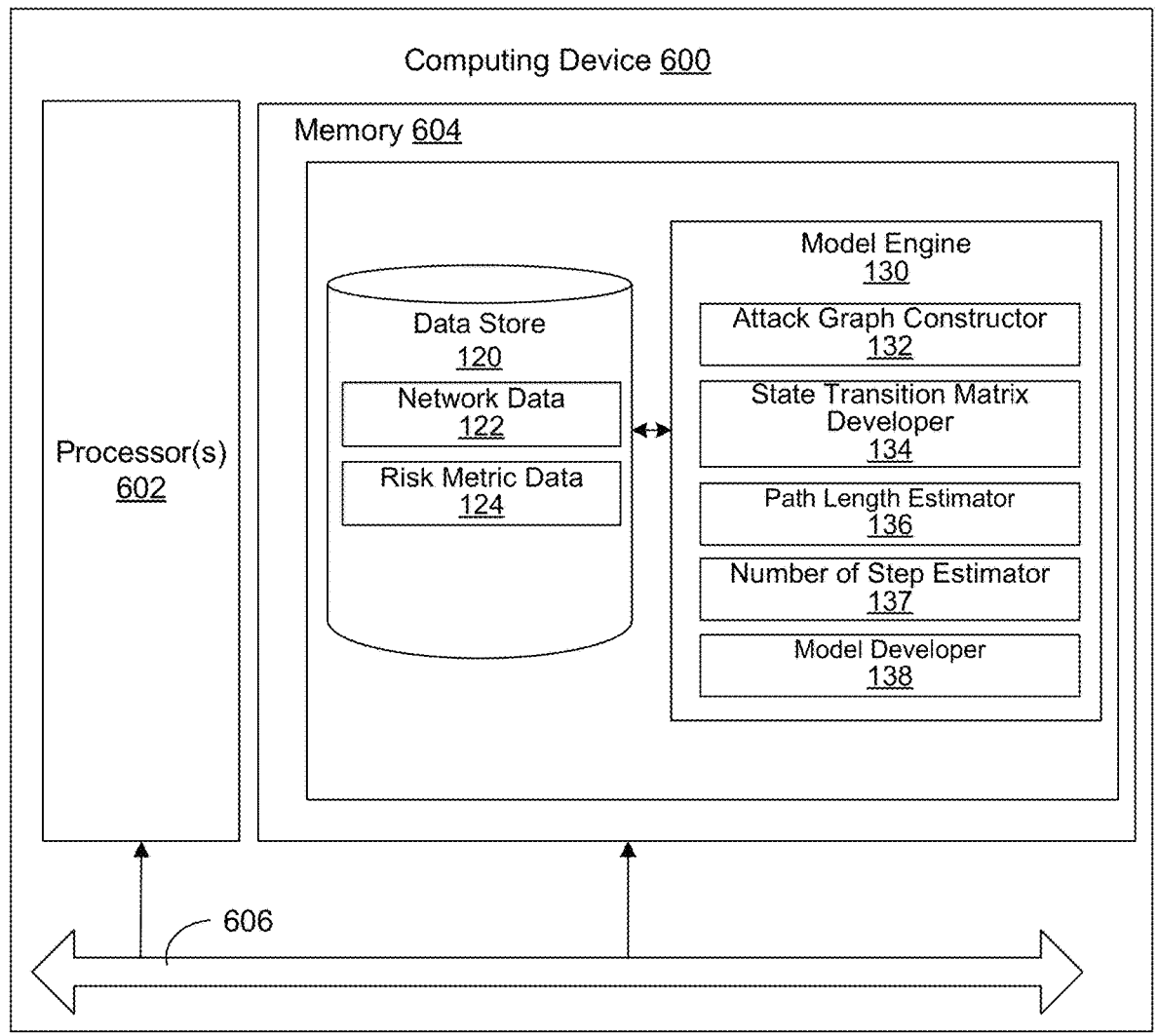
FIG. 15 illustrates an example schematic block diagram of a computing device for the computing environment shown in FIG. 2 according to various embodiments described herein.

FIG. 15 illustrates an example schematic block diagram of a computing device 600 for the computing environment 110 shown in FIG. 2 according to various embodiments described herein. The computing device 600 includes at least one processing system, for example, having a processor 602 and a memory 604, both of which are electrically and communicatively coupled to a local interface 606. The local interface 606 can be embodied as a data bus with an accompanying address/control bus or other addressing, control, and/or command lines.

In various embodiments, the memory 604 stores data and software or executable-code components executable by the processor 602. For example, the memory 604 can store executable-code components associated with the model engine 130 for execution by the processor 602. The memory 604 can also store data such as that stored in the data store 120, among other data.

It is noted that the memory 604 can store other executable-code components for execution by the processor 602. For example, an operating system can be stored in the memory 604 for execution by the processor 602. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 604 stores software for execution by the processor 602. In this respect, the terms "executable" or "for execution" refer to software forms that can ultimately be run or executed by the processor 602, whether in source, object, machine, or other form. Examples of executable programs include, for example, a compiled program that can be translated into a machine code format and loaded into a random access portion of the memory 604 and executed by the processor 602, source code that can be expressed in an object code format and loaded into a random access portion of the memory 604 and executed by the processor 602, or source code that can be interpreted by another executable program to generate instructions in a random access portion of the memory 604 and executed by the processor 602, etc.

An executable program can be stored in any portion or component of the memory 604 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 604 can include both volatile and nonvolatile memory and data storage components. Volatile components are those that do not retain data values upon loss of power. Nonvolatile components are those that retain data upon a loss of power. Thus, the memory 604 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 602 can be embodied as one or more processors 602 and the memory 604 can be embodied as one or more memories 604 that operate in parallel, respectively, or in combination. Thus, the local interface 606 facilitates communication between any two of the multiple processors 602, between any processor 602 and any of the memories 604, or between any two of the memories 604, etc. The local interface 606 can include additional systems designed to coordinate this communication, including, for example, a load balancer that performs load balancing.

As discussed above, the model engine 130, and the components thereof, can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIG. 14 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 602. The machine code can be converted from the source code, etc. Further, each block can represent, or be connected with, a circuit or a number of interconnected circuits to implement a certain logical function or process step.

Although the flowchart or process diagrams in FIG. 14 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including the model engine 130 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIG. 14. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

At least the following is claimed:

1. A method implemented by at least one computing device executing instructions for evaluating cyber-security reliability of a computer network system, comprising:
    identifying, by the at least one computing device, one or more vulnerabilities for one or more components in the computer network system;
    generating, by the at least one computing device, expected path length (EPL) data based on the one or more vulnerabilities for an attacker to compromise the computer network system;
    generating, by the at least one computing device, minimum number of steps data based on the EPL data;
    generating, by the at least one computing device, a parametric probability distribution function (PDF) model that fits the minimum number of steps data for probabilistically characterizing behaviors of the minimum number of step data;
    generating, by the at least one computing device, a cumulative distribution function (CDF) model based on the parametric PDF model;
    generating, by the at least one computing device, a parametric reliability model based on the CDF model; and
    automatically monitoring, by the at least one computing device, a reliability status of the computer network system based on the parametric reliability model.

2. The method of claim 1, wherein the minimum number of steps data include a minimum amount of time until a failure event of the computer network system occurs.

3. The method of claim 1, wherein the one or more vulnerabilities comprises one or more operating system vulnerabilities and one or more corresponding common vulnerability scoring system (CVSS) scores.

4. The method of claim 1, wherein generating the expected path length (EPL) data comprises:
    randomly selecting, by the at least one computing device, a predetermined number of the one or more vulnerabilities;
    generating, by the at least one computing device, a set of the EPL data based on the predetermined number of the one or more vulnerabilities; and
    repeating, by the at least one computing device, the random selection and the EPL data generation steps to generate the minimum number of steps data.

5. The method of claim 1, wherein the parametric PDF model is a mixture of at least two probability distributions.

6. The method of claim 5, wherein the mixture of the at least two probability distributions comprises a sum of a Gamma probability distribution and a LogNormal probability distribution.

7. The method of claim 6, wherein the Gamma probability distribution is obtained based on a shape parameter and a scale parameter,
    wherein the LogNormal probability distribution is obtained based on a mean deviation parameter and a standard deviation parameter, and
    wherein the sum of the Gamma probability distribution and the LogNormal probability distribution is a weighted sum of the Gamma probability distribution with a first weight parameter and the LogNormal probability distribution and a second weight parameter.

8. The method of claim 1, wherein the CDF model is generated further based on a complementary error function.

9. The method of claim 1, wherein the reliability model is obtained by subtracting the CDF model from 1.

10. The method of claim 1, wherein the monitoring the reliability status of the computer network system based on the parametric reliability model further comprises:
    determining whether to monitor the reliability status of the computer network system using the parametric reliability model or a non-parametric reliability model; and
    monitoring the reliability status of the computer network system based on either the parametric reliability model or the non-parametric reliability model.

11. The method of claim 10, further comprising:
    selecting, by the at least one computing device, a kernel function and a bandwidth to minimize an asymptotic mean integrated squared error of the minimum number of steps data;
    generating, by the at least one computing device, a kernel density estimation model to estimate a non-parametric PDF model that fits the minimum number of steps data based on the kernel function, the bandwidth, and the minimum number of steps data;
    generating, by the at least one computing device, a kernel cumulative distribution function model based on the kernel density estimation model;
    generating, by the at least one computing device, a non-parametric reliability model based on the kernel cumulative distribution function model.

12. The method of claim 11, wherein the kernel density estimation model is generated further based on a sample size and a target density.

13. The method of claim 11, wherein the non-parametric reliability model is generated by subtracting the kernel cumulative distribution function model from 1.

14. A method implemented by at least one computing device executing instructions for evaluating cyber-security reliability of a computer network system, comprising:
- identifying, by the at least one computing device, vulnerability information for one or more components in the computer network system;
- generating, by the at least one computing device, minimum number of steps data based on the vulnerability information for an attacker to reach a goal state node in the computer network system;
- identifying, by the at least one computing device, a parametric probability distribution function (PDF) model that fits the minimum number of steps data for probabilistically characterizing behaviors of the minimum number of steps data;
- in response to failure to identify the parametric PDF model, selecting, by the at least one computing device, a kernel function and a bandwidth to minimize an asymptotic mean integrated squared error of the minimum number of steps data;
- generating, by the at least one computing device, a kernel density estimation model to estimate a non-parametric PDF model that fits the minimum number of steps data based on the kernel function, the bandwidth, and the minimum number of steps data;
- generating, by the at least one computing device, a kernel cumulative distribution function model based on the kernel density estimation model;
- generating, by the at least one computing device, a non-parametric reliability model based on the kernel cumulative distribution function model; and
- automatically monitoring, by the at least one computing device, a reliability status of the computer network system based on the parametric PDF model or the non-parametric reliability model.

15. The method of claim 14, wherein the minimum number of steps data include a minimum amount of time until a failure event of the computer network system occurs.

16. The method of claim 14, wherein the kernel density estimation model is generated further based on a sample size and a target density.

17. The method of claim 14, wherein the non-parametric reliability model is generated by subtracting the kernel cumulative distribution function model from 1.

18. A system for evaluating cyber-security reliability of a computer network system, comprising:
- a memory device configured to store computer-readable instructions thereon; and
- at least one computing device comprising at least one processing device directed, through execution of the computer-readable instructions, to:
  - identify, by the at least one computing device, vulnerability information for one or more components in the computer network system;
  - generate, by the at least one computing device, minimum number of steps data based on the vulnerability information for an attacker to reach a goal state node in the computer network system;
  - identify, by the at least one computing device, a parametric probability distribution function (PDF) model that fits the minimum number of steps data for probabilistically characterizing behaviors of the minimum number of steps data;
  - in response to failure to identify the parametric PDF model, selecting, by the at least one computing device, a kernel function and a bandwidth to minimize an asymptotic mean integrated squared error of the minimum number of steps data;
  - generate, by the at least one computing device, a kernel density estimation model to estimate a non-parametric PDF model that fits the minimum number of steps data based on the kernel function, the bandwidth, and the minimum number of steps data;
  - generate, by the at least one computing device, a kernel cumulative distribution function model based on the kernel density estimation model;
  - generate, by the at least one computing device, a non-parametric reliability model based on the kernel cumulative distribution function model; and
  - automatically monitor, by the at least one computing device, a reliability status of the computer network system based on the parametric PDF model or the non-parametric reliability model.

19. The system of claim 18, wherein the kernel density estimation model is generated further based on a sample size and a target density.

20. The system of claim 18, wherein the non-parametric reliability model is generated by subtracting the kernel cumulative distribution function model from 1.

* * * * *